United States Patent
Alshina et al.

(10) Patent No.: US 9,961,365 B2
(45) Date of Patent: May 1, 2018

(54) SCALABLE VIDEO ENCODING METHOD AND APPARATUS USING IMAGE UP-SAMPLING IN CONSIDERATION OF PHASE-SHIFT AND SCALABLE VIDEO DECODING METHOD AND APPARATUS

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 14/759,319

(22) PCT Filed: Jan. 6, 2014

(86) PCT No.: PCT/KR2014/000094
§ 371 (c)(1),
(2) Date: Jul. 6, 2015

(87) PCT Pub. No.: WO2014/107066
PCT Pub. Date: Jul. 10, 2014

(65) Prior Publication Data
US 2015/0341661 A1    Nov. 26, 2015

Related U.S. Application Data

(60) Provisional application No. 61/748,919, filed on Jan. 4, 2013.

(51) Int. Cl.
*H04N 7/12* (2006.01)
*H04N 11/02* (2006.01)
(Continued)

(52) U.S. Cl.
CPC .......... *H04N 19/59* (2014.11); *H04N 19/117* (2014.11); *H04N 19/182* (2014.11);
(Continued)

(58) Field of Classification Search
USPC ...................................... 375/240.12
See application file for complete search history.

(56) References Cited

U.S. PATENT DOCUMENTS 7,956,930 B2 * 6/2011 Sullivan ............... G06T 3/4007
348/443
8,126,054 B2   2/2012 Hsiang
(Continued)

FOREIGN PATENT DOCUMENTS

CN    101395921 A    3/2009
JP    2010-22020 A   1/2010
(Continued)

OTHER PUBLICATIONS

Communication dated May 9, 2014 issued by the International Searching Authority in counterpart International Application No. PCT/KR2014/000094 (PCT/ISA/210/237).
(Continued)

*Primary Examiner* — Chikaodili E Anyikire
(74) *Attorney, Agent, or Firm* — Sughrue Mion, PLLC

(57) ABSTRACT

Provided is a method of determining an up-sampling filter to accurately interpolate a sample value for each sampling position according to an up-sampling ratio for scalable video encoding and decoding. An up-sampling method for scalable video encoding includes determining a phase shift between a pixel of a low resolution image and a pixel of a high resolution image based on a scaling factor between the high resolution image and the low resolution image; selecting at least one filter coefficient set corresponding to the determined phase shift from filter coefficient data comprising
(Continued)

filter coefficient sets corresponding to phase shifts; generating the high resolution image by performing filtering on the low resolution image by using the selected at least one filter coefficient set; and generating an improvement layer bitstream comprising high resolution encoding information generated by performing encoding on the high resolution image and up-sampling filter information indicating the determined phase shift.

3 Claims, 28 Drawing Sheets

(51) Int. Cl.
| | | |
|---|---|---|
| H04N 19/59 | (2014.01) | |
| H04N 19/182 | (2014.01) | |
| H04N 19/117 | (2014.01) | |
| H04N 19/186 | (2014.01) | |
| H04N 19/82 | (2014.01) | |
| H04N 19/30 | (2014.01) | |
| H04N 19/187 | (2014.01) | |

(52) U.S. Cl.
CPC ......... *H04N 19/186* (2014.11); *H04N 19/187* (2014.11); *H04N 19/30* (2014.11); *H04N 19/82* (2014.11)

(56) References Cited

U.S. PATENT DOCUMENTS

| | | | |
|---|---|---|---|
| 8,428,144 B2 | 4/2013 | Park et al. | |
| 8,638,862 B2 | 1/2014 | Sun | |
| 8,660,180 B2 | 2/2014 | Park et al. | |
| 2006/0294171 A1* | 12/2006 | Bossen | H04N 19/139 |
| | | | 708/300 |
| 2007/0116131 A1* | 5/2007 | Sun | G06T 3/4007 |
| | | | 375/240.29 |
| 2007/0160153 A1* | 7/2007 | Sullivan | G06T 3/4007 |
| | | | 375/240.29 |
| 2008/0232452 A1* | 9/2008 | Sullivan | H03H 17/0294 |
| | | | 375/232 |
| 2013/0182780 A1 | 7/2013 | Alshin et al. | |
| 2014/0098883 A1* | 4/2014 | Hannuksela | H04N 19/597 |
| | | | 375/240.16 |
| 2015/0189314 A1 | 7/2015 | Alshina et al. | |

FOREIGN PATENT DOCUMENTS

| | | |
|---|---|---|
| KR | 10-1158437 B1 | 6/2012 |
| TW | 201309035 A1 | 2/2013 |
| WO | 2012044105 A2 | 4/2012 |
| WO | 2013002579 A2 | 1/2013 |

OTHER PUBLICATIONS

Communication dated Jul. 15, 2016 issued by the European Patent Office in counterpart European Patent Application No. 14735149.8.
Guo L et al; "Signaling of Phase Offset in Up-sampling Process and Chroma Sampling Location"; Join Collaborative Team on Video Coding (JCT-VC) of ITU-T SG 16 WP and ISO/IEC JTC 1/SC 29/WG 11; 13th Meeting Incheon; Apr. 25, 2013; XP030114422; 8 pgs. total; Doc. JCTVC-M0465.
Alshina E et al; "TEA1: Fixed up-sampling filter tests by Samsung (tests 4.1 and 4.4)"; Joint Collaborative Team on Video Coding (JCT-VC) of ITU-T SG 16 WP 3 and ISO/IEC JTC 1/SC 29/WG 11; 12th Meeting; Jan. 7, 2013; XP030113571; 10 pgs. total; Doc. JCTVC-L0083.
Alshina E et al; "About phase calculation and up-sampling filter coefficients in JCTVC-M0188 and JCTVC-M0322"; Joint Collaborative Team on Video Coding (JCT-VC) of ITU-T SG 16 WP 3 and ISO/IEC JTC 1/SC 29/WG 11; 13th Meeting; Apr. 17, 2013; XP030114382; 7 pgs. total; Doc. JCTVC-M0425.
Chen J et al; "Description of scalable video coding technology proposal by Qualcomm (configuration 1)"; Joint Collaborative Team on Video Coding (JCT-VC) of ITU-T SG16 WP3 and ISO/IEC JTC1/SC29/WG11; 11th Meeting; Oct. 2, 2012; XP030112967; 19 pgs. total; Doc. JCTVC-K0035.
Communication dated Sep. 28, 2017, issued by the State Intellectual Property Office of P.R. China in corresponding Chinese application No. 201480012095.7.

* cited by examiner

FIG. 10

| PHASE SHIFT INDEX | TARGET PHASE SHIFT | UP-SAMPLING RATIO |
|---|---|---|
| 0 | 0 | All |
| 1 | 1/16 | x 16/15 |
| 2 | 1/8 | x 8/7 (x 7/6) |
| 3 | 1/5 | x 5/3 (x 6/5) |
| 4 | 1/4 | x 4/3 , x8/7 (x7/6) |
| 5 | 1/3 | x 3/2, x6/5, ... |
| 6 | 3/8 | x 8/7 |
| 7 | 2/5 | x 5/3 |
| 8 | 1/2 | x 2, x4/3, x6/5, x8/7, ... |
| 9 | 3/5 | x 5/3 |
| 10 | 5/8 | x 8/7 |
| 11 | 2/3 | x 3/2, x6/5 (x7/6) |
| 12 | 3/4 | x 4/3, x8/7 |
| 13 | 4/5 | x 5/3 (x 6/5) |
| 14 | 7/8 | x 8/7 (x 7/6) |
| 15 | 15/16 | x 16/15 |

FIG. 11

| PHASE SHIFT INDEX | TARGET PHASE SHIFT | 8 TAP FILTER COEFFICIENT (x64 SCALING) |
|---|---|---|
| 0 | 0 | {0, 0, 0, 64, 0, 0, 0, 0} |
| 1 | 1/16 | {0, 1, -3, 63, 4, -2, 1, 0} |
| 2 | 1/8 | {-1, 3, -7, 63, 8, -2, 0, 0} or {-1, 2, -5, 62, 8, -3, 1, 0} |
| 3 | 1/5 | {-1, 4, -9, 59, 15, -6, 3, -1} or {-2, 5, -10, 60, 15, -6, 2, 0} |
| | 3/16 | {-1, 3, -8, 60, 13, -4, 1, 0} |
| 4 | 1/4 | {-1, 4, -10, 58, 17, -5, 1, 0} |
| 5 | 1/3 | {-1, 4, -11, 52, 26, -8, 3, -1} |
| 6 | 3/8 | {-1, 3, -9, 47, 31, -10, 4, -1} |
| 7 | 2/5 | {-1, 5, -12, 47, 32, -10, 4, -1} |
| | 7/16 | {-1, 4, -11, 45, 34, -10, 4, -1} |
| 8 | 1/2 | {-1, 4, -11, 40, 40, -11, 4, -1} |

PARTITION TYPE (800)

PREDICTION MODE (810)

SIZE OF TRANSFORMATION UNIT(820)

CODING UNIT (1010)

PREDICTION UNIT (1060)

SCALABLE VIDEO ENCODING METHOD AND APPARATUS USING IMAGE UP-SAMPLING IN CONSIDERATION OF PHASE-SHIFT AND SCALABLE VIDEO DECODING METHOD AND APPARATUS

CROSS-REFERENCE TO RELATED APPLICATIONS

This application is a national stage application of International Application No. PCT/KR2014/000094 filed on Jan. 6, 2014, and claims the benefit of U.S. Provisional Application No. 61/748,919 filed in the U.S. Patent and Trademark Office on Jan. 4, 2013, the contents of which are incorporated herein by reference in their entireties.

BACKGROUND

1. Field

Methods and apparatuses consistent with exemplary embodiments relate to video encoding and decoding using image up-sampling.

2. Description of the Related Art

Conventional image encoding and decoding splits one picture into macroblocks to encode an image. Thereafter, inter prediction or intra prediction is used to prediction encode each of the macroblocks.

Inter prediction is a method of compressing an image by removing a temporal redundancy between pictures and has motion estimation encoding as a representative example. Motion estimation encoding predicts each block of a current picture by using at least one reference picture. A predetermined evaluation function is used to search for a reference block that is most similar to a current block within a predetermined search range.

The current block is predicted based on the reference block, and a residual block—generated by subtracting a prediction block generated as a result of prediction from the current block—is encoded. In this regard, to more accurately perform prediction, interpolation is performed on the search range of the reference picture, sub-pixels of a pixel unit—smaller than an integer pet unit—are generated, and inter prediction is performed based on the generated sub-pixels.

SUMMARY

Methods and apparatuses consistent with exemplary embodiments determine an up-sampling filter to accurately interpolate a sample value for each sampling position according to an up-sampling ratio. Methods and apparatuses consistent with exemplary embodiments also provide scalable video encoding and a scalable video decoding of performing interlayer prediction by generating a high resolution prediction image from a low resolution image by using an accurate up-sampling filter selected according to a scalability scaling factor.

According to an aspect of an exemplary embodiment, there is provided an up-sampling method for scalable video encoding, the up-sampling method including determining a phase shift between a pixel of a low resolution image and a pixel of a high resolution image based on a scaling factor between the high resolution image and the low resolution image; selecting at least one filter coefficient set corresponding to the determined phase shift from filter coefficient data comprising filter coefficient sets corresponding to phase shifts; generating the high resolution image by performing filtering on the low resolution image by using the selected at least one filter coefficient set; and generating an improvement layer bitstream comprising high resolution encoding information generated by performing encoding on the high resolution image and up-sampling filter information indicating the determined phase shift.

According to an aspect of an exemplary embodiment, there is provided an up-sampling method for scalable video encoding, the up-sampling method including determining a phase shift between a pixel of a low resolution image and a pixel of a high resolution image based on a scaling factor between the high resolution image and the low resolution image; selecting at least one filter coefficient set corresponding to the determined phase shift from filter coefficient data comprising filter coefficient sets corresponding to phase shifts; generating the high resolution image by performing filtering on the low resolution image by using the selected at least one filter coefficient set; and generating an improvement layer bitstream comprising high resolution encoding information generated by performing encoding on the high resolution image and up-sampling filter information indicating the determined phase shift.

The generating of the high resolution image may include: when the filter coefficient data comprises filter coefficient sets corresponding to phase shifts according to a phase shift interval $1/16$, performing filtering by using i) a filter coefficient set corresponding to a phase shift $5/16$ in the filter coefficient data for up-sampling for the sampling position having the phase shift of $1/3$ when the ratio is 2:3 and ii) a filter coefficient set corresponding to a phase shift $11/16$ in the filter coefficient data for up-sampling for a sampling position having a determined phase shift of $2/3$ when the ratio is 2:3.

The generating of the high resolution image may include: when the filter coefficient data comprises filter coefficient sets corresponding to phase shifts according to a phase shift interval $1/8$, performing filtering by using i) a filter coefficient set corresponding to a phase shift $3/8$ in the filter coefficient data for up-sampling for the sampling position having the phase shift of $1/3$ when the ratio is 2:3 and ii) a filter coefficient set corresponding to a phase shift $5/8$ in the filter coefficient data for up-sampling for a sampling position having a determined phase shift of $2/3$ when the ratio is 2:3.

The determining of the phase shift may include: determining a phase shift between a luma pixel of the low resolution image and a luma pixel of the high resolution image based on the scaling factor; and determining a position of a chroma pixel of the high resolution image with respect to a position of the luma pixel of the high resolution image based on a color format and determining a phase shift between a chroma component pixel of the low resolution image and the chroma pixel of the high resolution image whose position is determined.

The generating of the improvement layer bitstream may include: recording the up-sampling filter information in at least one of a sequence parameter set (SPS), a picture parameter set (PPS), and a slice segment header.

According to an aspect of an exemplary embodiment, there is provided an up-sampling method for scalable video decoding, the up-sampling method including obtaining up-sampling filter information indicating a phase shift between a pixel of a low resolution image and a pixel of a high resolution image determined based on a scaling factor between the high resolution image and the low resolution image from an improvement layer bitstream; selecting at least one filter coefficient set corresponding to the determined phase shift from the up-sampling filter information included in filter coefficient data comprising corresponding filter coefficient sets for phase shifts; and generating the high resolution image by performing filtering on the low resolution image by using the selected at least one filter coefficient set.

The selecting of the at least one filter coefficient set may include: obtaining a phase shift between a luma pixel of the low resolution image and a luma pixel of the high resolution image from the up-sampling filter information; and obtaining a phase shift between a chroma component pixel of the low resolution image and a chroma component pixel of the high resolution image from the up-sampling filter information, wherein, when a position of a chroma pixel of the high resolution image with respect to a position of the luma pixel of the high resolution image is determined based on a color format, the obtained phase shift between the chroma component pixels is a phase shift between the chroma component pixel of the low resolution image and a chroma pixel of the high resolution image.

The obtaining of the up-sampling filter information may include: obtaining the up-sampling filter information from at least one of a sequence parameter set (SPS), a picture parameter set (PPS), and a slice segment header included in the improvement layer bitstream.

According to an aspect of an exemplary embodiment, there is provided a scalable video encoding apparatus including a filter coefficient data storage unit in which corresponding filter coefficient sets for phase shifts are recorded; a filter selector which determines a phase shift between a pixel of a low resolution image and a pixel of a high resolution image based on a scaling factor between the high resolution image corresponding to the low resolution image and the low resolution image and selects at least one filter coefficient set corresponding to the determined phase shift from filter coefficient data; an up-sampling unit which generates the high resolution image by performing filtering on the low resolution image by using the selected at least one filter coefficient set; a base layer encoder which generates a base layer bitstream comprising low resolution encoding information generated by performing encoding on the low resolution image; and an improvement layer encoder which generates an improvement layer bitstream comprising high resolution encoding information generated by performing encoding on the high resolution image and up-sampling filter information indicating the determined phase shift.

According to an aspect of an exemplary embodiment, there is provided a scalable video decoding apparatus including a filter coefficient data storage unit in which corresponding filter coefficient sets for phase shifts are recorded; an improvement layer receiver which obtains up-sampling filter information indicating a phase shift between a pixel of a low resolution image and a pixel of a high resolution image determined based on a scaling factor between the high resolution image and the low resolution image and high resolution encoding information from an improvement layer bitstream; a filter selector which selects at least one filter coefficient set corresponding to the determined phase shift from the up-sampling filter information included in filter coefficient data; an improvement layer decoder which generates the high resolution image by performing filtering on the low resolution image by using the selected at least one filter coefficient set and decodes the high resolution image by using the generated high resolution image and the obtained high resolution encoding information; and a base layer decoder which decodes the low resolution image by using low resolution encoding information obtained from a base layer bitstream.

According to an aspect of an exemplary embodiment, there is provided a computer-readable recording medium having recorded thereon a program for executing the up-sampling method. According to another aspect according to the present disclosure, there is provided a computer-readable recording medium having recorded thereon a program for executing the video encoding method. According to another aspect according to the present disclosure, there is provided a computer-readable recording medium having recorded thereon a program for executing the video decoding method.

According to aspects of the exemplary embodiments, if a phase shift corresponding to a sampling position according to a current up-sampling ratio is specified, and filter coefficients for determining a sample value of a sampling position positioned corresponding to the phase shift are accurately determined, a sample value of an accurate sampling position may also be accurately determined through filtering using the filter coefficients.

BRIEF DESCRIPTION OF THE DRAWINGS

FIG. 10 is a table of up-sampling ratios corresponding to a phase shift interval according to exemplary embodiments;

FIG. 11 is a table of 8 tap up-sampling filter coefficients having a phase shift interval of $1/16$ according to exemplary embodiments;

DETAILED DESCRIPTION OF EXEMPLARY EMBODIMENTS

Hereinafter, the term 'image' may refer to a still image or a moving picture, such as a video throughout the present disclosure.

Hereinafter, up-sampling of an image using an up-sampling filter by taking into account a phase shift according to exemplary embodiments will be described in detail with reference to FIGS. 1 through 11. Hereinafter, scalable video encoding and decoding using an up-sampling filter according to exemplary embodiments will be described with reference to FIGS. 12A through 14. Hereinafter, video encoding and decoding that are to be performed on each layer in a scalable video system based on a coding unit having a tree structure will be described with reference to FIGS. 15 through 25.

Up-sampling of an image using an up-sampling filter by taking into account a phase shift according to exemplary embodiments will now be described in detail with reference to FIGS. 1 through 11.

Figure 1:
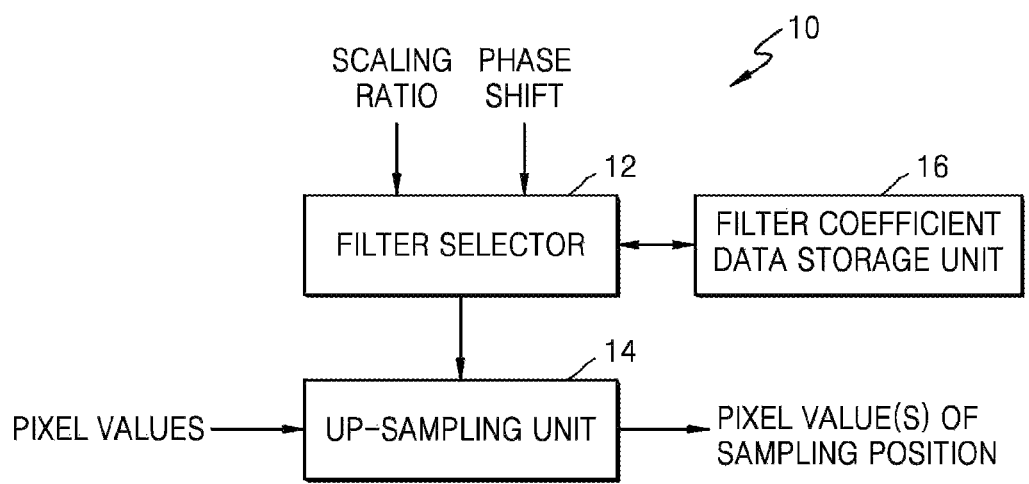
FIG. 1 is a block diagram of an image up-sampling apparatus according to an exemplary embodiment.

FIG. 1 is a block diagram of an image up-sampling apparatus 10 according to an exemplary embodiment.

The image up-sampling apparatus 10 using symmetrical and asymmetrical up-sampling filters according to an exemplary embodiment includes a filter selector 12, an up-sampling unit 14, and a filter coefficient data storage unit 16.

Interpolation of an image may be used to convert a low resolution image into a high resolution image. Interpolation of the image is used to convert an interlaced image into a progressive image and convert a low quality image into a high quality image by up-sampling the low quality image.

When a video encoding apparatus encodes an image, a motion estimation and motion compensation unit may perform inter prediction by using an interpolated reference frame. The motion estimation and motion compensation unit may increase the accuracy of inter prediction by interpolating a reference frame, generating a high quality image, and performing motion estimation and compensation based on the high quality image. Likewise, when an image decoding apparatus decodes the image, a motion compensation unit may increase the accuracy of inter prediction by performing motion compensation by using the interpolated reference frame.

A scalable encoding apparatus may use an image up-sampled by interpolating a base layer image as a prediction image or a reference image of an enhancement layer to perform inter-layer prediction between a base layer and the enhancement layer.

The image up-sampling apparatus 10 may receive a low resolution image, interpolate pel unit pixels of the low resolution image, and generate sub-pel unit pixels. The received image may be a sequence, a picture, a frame, and blocks of a low resolution video. The sub-pel unit of the low resolution image may correspond to a pel unit of a high resolution image.

For example, when a scaling factor of the low resolution image and the high resolution image is defined as a width of the high resolution image with respect to a width of the low resolution image, if the scaling factor of the low resolution image and the high resolution image is 1:2, a ½ pel unit pixel positioned between pel unit pixels of the low resolution image may correspond to pel unit pixels of the high resolution image.

Therefore, a sub-pel unit pixel generated by interpolating the pel unit pixels of the low resolution image may correspond to the pel unit pixel of the high resolution image.

The image up-sampling apparatus 10 may generate the high resolution image by performing up-sampling on the low resolution image through filtering. In particular, sub-pel unit pixels may be generated through interpolation filtering of the low resolution image, and intervals between original pel unit pixels of the low resolution image and the sub-pel unit pixels generated through interpolation filtering may be extended to the pel unit. Accordingly, the original pel unit pixels of the low resolution image and the sub-pel unit pixels may be determined to correspond to positions of the pel unit pixels of the high resolution image. Thus, the pel unit pixels of the high resolution image may be determined through interpolation filtering of the low resolution image, and an interpolation filtering operation may be understood as a filtering operation for up-sampling in the present specification.

The sub-pel unit pixel is newly sampled through interpolation filtering, and thus, a sub-pel unit pixel position determined through interpolation filtering may be a sampling position generated through up-sampling.

The sampling position may be different according to a scaling factor of the high resolution image that is to be generated through up-sampling of the low resolution image. For example, when the scaling factor of the low resolution image and the high resolution image is 1:2, one sampling position may be determined in a pixel position of ½ between two neighboring pixels of the low resolution image so that three pixels may be mapped at an equal interval. As another example, when the scaling factor of the low resolution image and the high resolution image is 2:3, four pixels may be mapped at an equal interval for each of ⅓ and ⅔ pel units between three neighboring pixels of the low resolution image.

A phase shift may be present between a pel unit pixel position of the low resolution image and a pixel position (sampling position) of the high resolution image. The pel unit pixel position of the low resolution image is fixed, and thus, if the sampling position is determined according to the scaling factor of the low resolution image and the high resolution image, the phase shift between the pel unit pixel and a pixel of the high resolution image may be determined.

Thus, the phase shift between a pixel of the low resolution image and the pixel of the high resolution image may be determined according to the scaling factor of the low resolution image to the high resolution image. That is, if the scaling factor between the low resolution image and the high resolution image is not 1:1, the phase shift may also be changed.

A filter coefficient set is determined according to the sampling position, and thus, the filter coefficient set may be determined according to the phase shift. Accordingly, the filter coefficient data storage unit 16 may store filter coefficient sets mapped for phase shifts between pixels of the low resolution image and pixels of the high resolution image. For example, the filter coefficient data storage unit 16 may store the filter coefficient sets individually set for each of phase shifts 1/16, ⅛, ⅕, ¼, ⅓, ⅜, ⅖, and ½.

The filter selector 12 may determine the phase shift between the pixel of the low resolution image and the pixel of the high resolution image based on the scaling factor of the low resolution image and the high resolution image. However, at least one sampling position for one ratio is determined, and thus, at least one phase shift may be mapped for one scaling factor. Thus, although the low resolution image is up-sampled to the high resolution image according to one scaling factor, up-sampling filtering may be performed by selecting different filters for phase shifts. Therefore, the filter selector 12 may select different up-sampling filters based on phase shifts among up-sampling filters for generating a pixel value of the sampling position positioned between the pel unit pixels of the low resolution image.

As described above, the sampling position may be determined according to the scaling factor of the low resolution image and the high resolution image. An output value obtained by performing filtering on the low resolution image by using the up-sampling filter may be determined as a pixel value corresponding to the sampling position.

The up-sampling unit 14 may generate the pixel value of the sampling position by interpolating pel unit pixels neighboring the sampling position by using the up-sampling filter selected by the filter selector 12. Up-sampling filtering of the pel unit pixels may include an operation of performing up-sampling filtering on pel unit reference pixels including the pel unit pixels neighboring the sampling position.

The up-sampling filter 14 may be a 1-dimensional filter. Thus, filtering may be performed on pel unit pixels neighboring the low resolution image in a horizontal direction by using the selected up-sampling filter, and thus, up-sampling in the horizontal direction may be performed. Filtering may be performed on pel unit pixels neighboring the low resolution image in a vertical direction by using the selected up-sampling filter, and thus, up-sampling in the vertical direction may be performed. Thus, up-sampling filtering is continuously performed on the low resolution image in the horizontal direction and in the vertical direction, and thus, pixel values of the high resolution image may be determined.

The filter selector 12 may individually determine an up-sampling filter according to the sampling position among the up-sampling filters. The up-sampling filters may include a symmetrical up-sampling filter configured as a same number of filter coefficients with respect to the sampling position and an asymmetrical up-sampling filter configured as different numbers of filter coefficients with respect to the sampling position. The filter selector 12 may individually select the symmetrical up-sampling filter and the asymmetrical up-sampling filter according to the sampling position.

For example, a 7 tap up-sampling filter may be configured as three filter coefficients and four filter coefficients with respect to the sampling position. In this case, the 7 tap up-sampling filter may be the asymmetrical up-sampling filter.

For example, an 8 tap up-sampling filter may be configured as four filter coefficients and four filter coefficients with respect to the sampling position. In this case, the 8 tap up-sampling filter may be the symmetrical up-sampling filter.

When the filter selector 12 selects the asymmetrical up-sampling filter, the up-sampling unit 14 may perform filtering by referring to pel unit pixels positioned asymmetrically about the sampling position. When the filter selector 12 selects the symmetrical up-sampling filter, the up-sampling unit 14 may perform filtering by referring to pel unit pixels positioned symmetrically about the sampling position.

The filter coefficient data storage unit 16 may store a filter coefficient set of an up-sampling filter that is normalized to minimize a frequency response error that occurs as a result of interpolation using the up-sampling filter among the up-sampling filters. For example, up-sampling having a ratio of 2:3 is necessary to up-sample a low resolution video having resolution of 720 p to a high resolution video having resolution of 1080 p or up-sample a high definition (HD) video to a full HD video. The filter coefficient data storage unit 16 may store 8 tap filter coefficients {−1, 4, −11, 52, 26, −8, 3, −1} for a phase shift of ⅓ or ⅔ as a filter coefficient set for the ratio of 2:3.

The filter coefficient data storage unit 16 may store filter coefficients when the filter coefficients are magnified to integers. For example, the 8 tap filter coefficients {−1, 4, −11, 52, 26, −8, 3, −1} for the phase shift of ⅓ or ⅔ described above are filter coefficients that are magnified by 64. In this case, the up-sampling unit 14 may determine the pixel value of the sampling position only by minimizing a filtering output value by 64.

The filter coefficient data storage unit 16 may include filter coefficient sets corresponding to phase shifts according to a phase shift interval of 1/16. The up-sampling unit 14 may select a filter coefficient set corresponding to a phase shift of 5/16 among filter coefficient data stored in the filter coefficient data storage unit 16, for up-sampling for the sampling position having the phase shift of ⅓ when the ratio is 2:3. The up-sampling unit 14 may select a filter coefficient set corresponding to a phase shift of 11/16 among the filter coefficient data stored in the filter coefficient data storage unit 16, for up-sampling for the sampling position having the phase shift of ⅔ when the ratio is 2:3.

As another example, the filter coefficient data storage unit 16 may include filter coefficient sets corresponding to phase shifts according to a phase shift interval of ⅛. The up-sampling unit 14 may select a filter coefficient set corresponding to a phase shift of ⅜ among the filter coefficient data stored in the filter coefficient data storage unit 16, for up-sampling for the sampling position having the phase shift of ⅓ when the ratio is 2:3. The up-sampling unit 14 may select a filter coefficient set corresponding to a phase shift of ⅝ among the filter coefficient data stored in the filter coefficient data storage unit 16, for up-sampling for the sampling position having the phase shift of ⅔ when the ratio is 2:3.

The image up-sampling apparatus 10 may perform image interpolation by using different up-sampling filters for each color component. The filter selector 12 may select different up-sampling filters based on the sampling position and a color component of a current pixel among the up-sampling filters. Accordingly, the up-sampling unit 14 may generate pixel values of sampling positions by interpolating pel unit pixels by using the up-sampling filter individually selected for each color component.

For example, the filter selector 12 may determine an up-sampling filter of a luma component and an up-sampling filter of a chroma component. A phase shift between a luma pixel of the low resolution image and a luma pixel of the high resolution image may be different than a phase shift between a chroma pixel of the low resolution image and a chroma pixel of the high resolution image. Thus, the up-sampling filter of the luma component and the up-sampling filter of the chroma component may be individually determined according to their respective phase shifts.

For example, positions of the luma pixel and the chroma pixel may be determined based on a color format, such as 4:2:0 or 4:1:1. In particular, the position of the chroma pixel may be determined according to the position of the luma pixel. Thus, positions of luma pixels of the high resolution image may be determined according to the scaling factor between the low resolution image and the high resolution image, whereas positions of chroma pixels of the high resolution image may be determined according to the positions of the luma pixels of the high resolution image. Thus, a phase shift between the chroma pixel of the low resolution image and the chroma pixel of the high resolution image may be different from a phase shift between the luma pixel of the low resolution image and the luma pixel of the high resolution image.

Therefore, the filter selector 12 may determine the phase shift between the luma pixel of the low resolution image and the luma pixel of the high resolution image based on the scaling factor between the low resolution image and the high resolution image. Then, the filter selector 12 may determine the position of the chroma pixel of the high resolution image compared to the positions of the luma pixels of the high resolution image and determine the phase shift of the chroma pixel of the low resolution image and the chroma pixel of the high resolution image.

Accordingly, the filter selector 12 may individually determine a phase shift for the luma pixel and a phase shift for the chroma pixel, thereby individually determining the up-sampling filter for the luma pixel and the up-sampling filter for the chroma pixel according to their respective phase shifts.

The image up-sampling apparatus 10 may include a central processor controlling the filter selector 12, the up-sampling unit 14, and the filter coefficient data storage unit 16. Alternatively, the filter selector 12, the up-sampling unit 14, and the filter coefficient data storage unit 16 operate by their respective processors that organically operate, and thus, the image up-sampling apparatus 10 may generally operate. Alternatively, the filter selector 12, the up-sampling unit 14, and the filter coefficient data storage unit 16 may be controlled according to the control of an external processor of the image up-sampling apparatus 10.

The image up-sampling apparatus 10 may include one or more data storage units (e.g., memory) that store input and output data of the filter selector 12, the up-sampling unit 14, and the filter coefficient data storage unit 16. The image up-sampling apparatus 10 may include a memory control unit that controls data input and output of the one or more data storage units.

The image up-sampling apparatus 10 may include a separate processor including a circuit performing an image up-sampling operation. The image up-sampling apparatus 10 may include a storage medium storing an image interpolation module. The central processor may invoke and control execution of the interpolation module, and thus the image up-sampling operation according to various exemplary embodiments may be implemented.

If a phase shift corresponding to the sampling position according to a current up-sampling ratio is specified, and filter coefficients for determining a sample value of a sampling position positioned at a corresponding phase shift are accurately determined, a sample value of an accurate sampling position may be accurately determined through filtering using the filter coefficients.

The image up-sampling apparatus 10 may store the filter data regarding the filter coefficient sets used to determine an accurate sample value for phase shifts necessary for an up-sampling ratio between the low resolution image and the high resolution image. The image up-sampling apparatus 10 may specify a phase shift based on a scaling factor between a current low resolution image and a current high resolution image when up-sampling is performed and may selectively use an up-sampling filter corresponding to the specified phase shift among the filter data.

The image up-sampling apparatus 10 may store only a filter coefficient set for the up-sampling filter corresponding to the specific phase shift according to a frequently used up-sampling ratio, thereby efficiently performing up-sampling filtering. If p is a positive integer, and a phase shift interval is $2^{(-p)}$, each phase shift may be $i*2^{(-p)}$ (but in which i is an integer smaller than $2^p$). Only filter coefficient sets for the phase shift interval $i*2^{(-p)}$ according to the frequently used up-sampling ratio may be used to select a phase shift that is an approximate value and perform up-sampling filtering in each sampling unit.

Interpolation filtering for image up-sampling will now be described in detail with reference to FIGS. 2 through 4B below.

Figure 2:
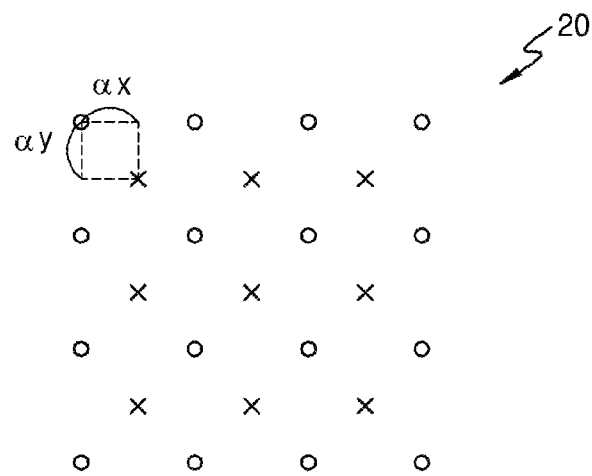
FIG. 2 illustrates sampling positions of pixels according to an exemplary embodiment.

FIG. 2 illustrates sampling positions of pixels according to an exemplary embodiment.

Referring to FIG. 2, the image up-sampling apparatus 10 generates pixel values of a position "×" that is a sampling position by interpolating pixel values of a position "O" of a predetermined block 20, i.e., pel unit pixel values of a spatial domain. The pixel values of the position "×" are sub-pel unit pixel values that have sampling locations determined according to $\alpha_x$ and $\alpha_y$. A case in which the predetermined block 20 is 4×4 is described by way of example in FIG. 2, but a size of a block is not limited to 4×4. It will be understood by those of ordinary skill in the art that the sub-pel unit pixel values may be generated through up-sampling filtering on a block of smaller size or larger size.

A motion vector is used for motion compensation and prediction of a current image. According to prediction encoding, a previously encoded image is referenced to predict the current image. The motion vector indicates a predetermined point of a reference image. Thus, the motion vector indicates a pel unit pixel of the reference image.

However, a position of a pixel that is to be referenced by the current image may be a point positioned between pel unit pixels of the reference image. Such a point is referred to as a position of a sub-pel unit. No pixel is present in the position of the sub-pel unit, and thus a pixel value of the sub-pel unit may be predicted by using pixel values of the pel unit pixels. That is, the pixel value of the sub-pel unit is estimated through interpolation on the pel unit pixels.

When up-sampling is performed through interpolation filtering, the pel unit and the sub-pel unit may be sampling positions.

A method of interpolating pixels of a pel unit will now be described with reference to FIGS. 3, 4A, 4B, and 4C.

Figure 3:
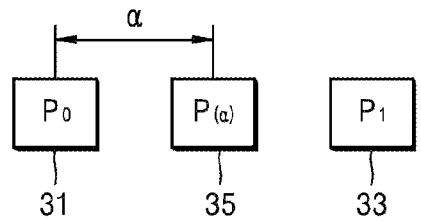
FIG. 3 illustrates a phase shift of an original pixel and a sampling position according to an exemplary embodiment.

FIG. 3 illustrates a phase shift of an original pixel and a sampling position according to an exemplary embodiment.

Referring to FIG. 3, the image up-sampling apparatus 10 generates a pixel value 35 of the sampling position by interpolating pixel values 31 and 33 of a pel unit of a low resolution image in a spatial domain. The pixel value 35 is a value of the sampling position determined according to a phase shift α.

If up-sampling is performed through interpolation on the low resolution image, a generated sampling position may be a pel unit pixel of a high resolution image, and a pixel value of the sampling position may be a pixel value of the high resolution image.

Figure 4A:
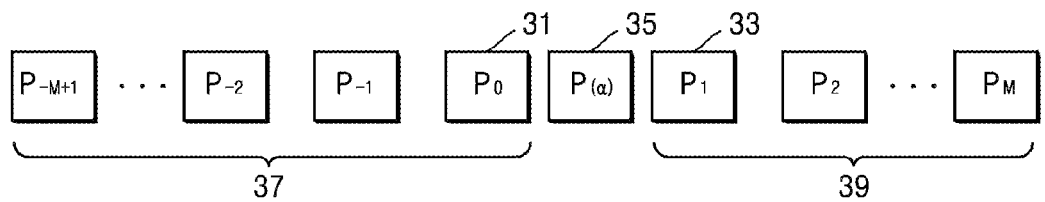
FIGS. 4A and 4B illustrate positions of reference pixels for up-sampling filtering according to exemplary embodiments.
Figure 4B:
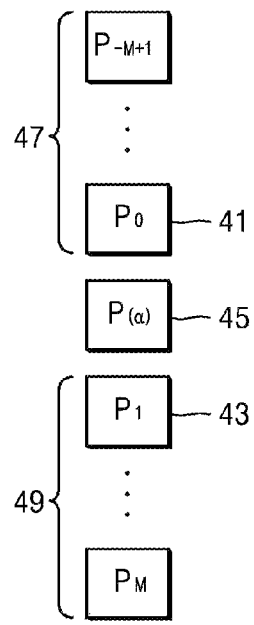

FIGS. 4A and 4B illustrate positions of reference pixels for up-sampling filtering according to exemplary embodiments.

Referring to FIG. 4A, to generate the pixel value 35 of the sampling position by interpolating the pixel values 31 and 33 of a low resolution image, pixel values 37 and 39 of a plurality of neighboring pel unit pixels including the pixel values 31 and 33 are used. In other words, a $0^{th}$ pixel and a $1^{st}$ pixel may be interpolated by performing up-sampling filtering on 2M pixel values from $-(M-1)$th pixel values to Mth pixel values.

A case in which pixel values in a horizontal direction are interpolated is described by way example in FIG. 4A, but 1D up-sampling filtering is possible by using pixel values in a vertical direction.

Referring to FIG. 4B, a pixel value P(α) 45 of a sampling position α in the vertical direction may be generated by interpolating pixel values $P_0$ 41 and $P_1$ 43 neighboring in the vertical direction. With respect to FIGS. 4A and 4B, an up-sampling filtering method may be similar only except that pixel values 47 and 49 arranged in the vertical direction are used to perform interpolation rather than the pixel values 37 and 39 arranged in a horizontal direction.

Not only 1D up-sampling filtering in the direction shown in FIGS. 4A and 4B, but also pixel values of sampling positions in various directions may be generated.

A sampling position and a phase shift for up-sampling will now be described with reference to FIGS. 5 through 7 below.

Figure 5:
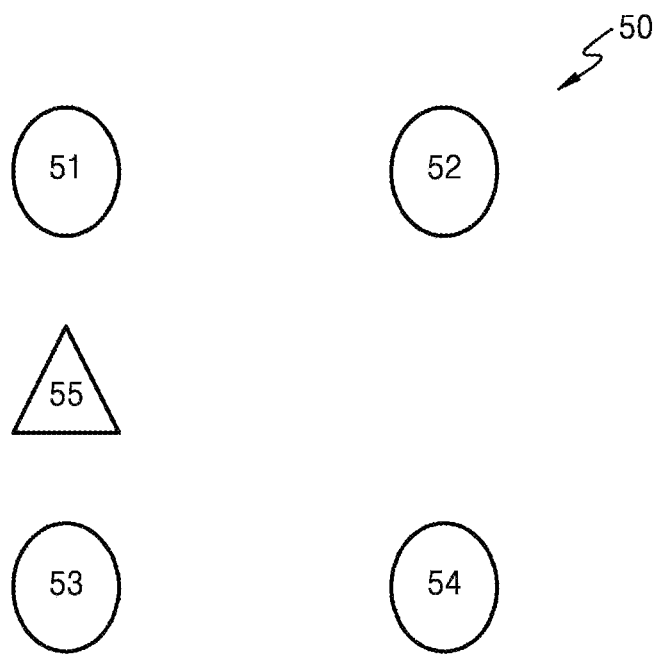
FIG. 5 illustrates a distribution of luma pixels and chroma pixels of a low resolution image according to an exemplary embodiment.

FIG. 5 illustrates a distribution of luma pixels and chroma pixels of a low resolution image according to an exemplary embodiment.

In the low resolution image 50 in the 4:2:0 color format, one chroma pixel 55 is mapped to four luma pixels 51, 52, 53, and 54.

When a width and a height of a high resolution image are iEWidth and iEHeight and a width and a height of the low resolution image are iBWidth and iBHeight, respectively, an up-sampling ratio dsFactor may be determined as a ratio iEWidth/iBWidth of the width of the high resolution image with respect to the width of the low resolution image.

A horizontal distance (a horizontal phase shift) between pixels of the low resolution image is denoted by iPhaseX, and a vertical distance (a vertical phase shift) is denoted by iPhaseY.

A distance displacement for horizontal interpolation or vertical interpolation between the luma pixels 51, 52, 53, and 54 of the low resolution image is 0. A vertical distance displacement for horizontal interpolation of the chroma pixel 55 is 0. A vertical distance displacement for vertical interpolation is ½.

In general, a phase shift Phase between pixel positions between the low resolution image and the high resolution image may be determined according to the following equation:

$$\text{Phase}=(i+\text{displacement}/2)/ds\text{Factor}-\text{displacement}/2$$

Therefore, if the up-sampling ratio is 2, and a distance between pixels of the low resolution image is 0, the phase shift Phase between the low resolution image and the high resolution image may be 0 and ½. If the up-sampling ratio is 2, and the distance between the pixels of the low resolution image is 1, the phase shift Phase between the low resolution image and the high resolution image may be ⅜ and ⅞.

However, when the up-sampling ratio 2, the phase shift Phase 0, ⅜, ⅞, and 1 may be expressed as a 1/16 sampling unit. Thus, a pixel position of the high resolution image is determined according to an equation indicating up-sampling of the 1/16 sampling unit below.

The horizontal phase shift iPhaseX and the vertical phase shift iPhaseY between the luma pixels 51, 52, 53, and 54 of the low resolution image are respectively 0 and 0. The horizontal phase shift iPhaseX and the vertical phase shift iPhaseY of the chroma pixel 55 are respectively 0 and 1.

In Equation 1, iRefPos16XX and iRefPos16YY denote sampling positions of the 1/16 sampling unit on the low resolution image, $$i\text{RefPos16}XX=((i*i\text{Scale}X+i\text{Add}X)>>i\text{Shift}XM4)-i\text{Delta}X;$$

$$i\text{RefPos16}YY=((j*i\text{Scale}Y+i\text{Add}Y)>>i\text{Shift}YM4)-i\text{Delta}Y;$$

[Equation 1]

In Equation 1, i is a number equal to or greater than 0 and smaller than the width iEWidth of the high resolution image, and j is a number equal to greater than 0 and smaller than the height iEHight of the high resolution image.

Variables iScaleX, iAddX, iShiftXM4, iDeltaX, iScaleY, iAddY, iShiftYM4, and iDeltaY for determining iRefPos16XX and iRefPos16YY may be respectively determined according to the following equations:

$$i\text{Shift}X=16;$$

$$i\text{Shift}Y=16;$$

$$i\text{Add}X=(((i\text{BWidth}*i\text{Phase}X)<<(i\text{Shift}X-2))+(i\text{EWidth}>>1))/i\text{EWidth}+(1<<(i\text{Shift}X-5));$$

$$i\text{Add}Y=(((i\text{BHeight}*i\text{Phase}Y)<<(i\text{Shift}Y-2))+(i\text{EHeight}>>1))/i\text{EHeight}+(1<<(i\text{Shift}Y-5));$$

$$i\text{Delta}X=4*i\text{Phase}X;$$

$$i\text{Delta}Y=4*i\text{Phase}Y;$$

$$i\text{Shift}XM4=i\text{Shift}X-4;$$

$i$ShiftYM4=$i$ShiftY−4;

$i$ScaleX=(($iB$Width<<$i$ShiftX)+($iE$Width>>1))/$iE$Width;

$i$ScaleY=(($iB$Height<<$i$ShiftY)+($iE$Height>>1))/$iE$Height;

iPHaseX and iPhaseY are different according to a luma pixel or a chroma pixel, and thus, sampling positions iRefPos16XX and iRefPos16YY may be different.

If the sampling position for performing up-sampling filtering on the low resolution image is extended, the sampling positions iRefPos16XX and iRefPos16YY indicate corresponding sampling positions for each pixel position of the high resolution image.

Thus, a phase shift iPhaseXX of the high resolution image in the horizontal direction and a pixel position iRefPosXX in the horizontal direction, a phase shift iPhaseYY in the vertical direction and a pixel position iRefPosYY in the vertical direction may be respectively determined by using the following equations iRefPos16XX and iRefPos16YY:

$i$PhaseXX=$i$RefPos16$XX$ & 15;

$i$RefPosXX=$i$RefPos16$XX$>>4;

$i$PhaseYY=$i$RefPos16$YY$ & 15;

$i$RefPosYY=$i$RefPos16$YY$>>4;

Therefore, a sampling position of the high resolution image, i.e. a pixel position, may be determined according to Equation 1 above without a division operation.

A phase shift according to an up-sampling ratio will now be described in detail with reference to FIGS. 6 and 7. As shown in the legend of FIG. 6, a big circle pixel 61 is a luma pixel of the low resolution image 50, a big triangle pixel 62 is a chroma pixel of the low resolution image 50, a small circle pixel 63 is a luma pixel of a high resolution image, and small triangle pixel 64 is a chroma pixel of the high resolution image.

Figure 6:
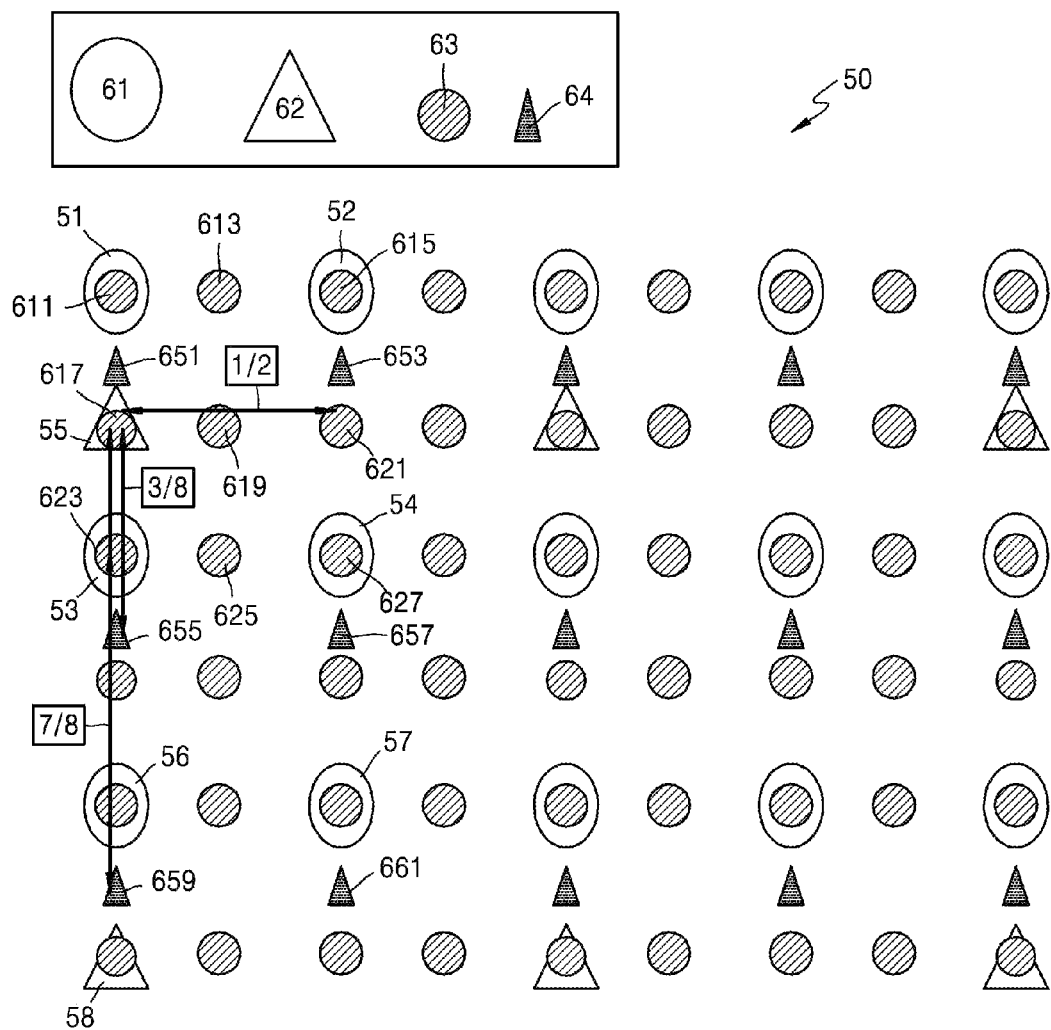
FIG. 6 illustrates a distribution of low and high resolution luma pixels and low and high resolution chroma pixels when a scaling factor between a low resolution image and a high resolution image according to an exemplary embodiment.

FIG. 6 illustrates a distribution of low and high resolution luma pixels and low and high resolution chroma pixels when a scaling factor between the low resolution image and a high resolution image according to an exemplary embodiment.

Low resolution luma pixels 51, 52, 53, 54, 56, and 57 and low resolution chroma pixels 55 and 58 are positioned according to the 4:2:0 color format.

High resolution luma pixels 611, 613, 615, 617, 619, 621, 623, 625, and 627 are positioned based on positions of the low resolution luma pixels 51, 52, 53, 54, 56, and 57 according to an up-sampling ratio of 2. High resolution chroma pixels 651, 653, 655, 657, 659, and 661 are positioned based on positions of the high resolution luma pixels 611, 613, 615, 617, 619, 621, 623, 625, and 627 according to the 4:2:0 color format.

In a luma pixel, phase shifts between the low resolution image 50 and the high resolution image are 0 and ½. For example, a horizontal phase shift between the low resolution luma pixel 51 and the high resolution luma pixel 611 is 0, and a horizontal phase shift between the low resolution luma pixel 51 and the high resolution luma pixel 613 is ½. A vertical phase shift between the low resolution luma pixel 51 and the high resolution luma pixel 611 is 0, and a vertical horizontal phase shift between the low resolution luma pixel 51 and the high resolution luma pixel 617 is ½.

In a chroma pixel, the phase shifts between the low resolution image 50 and the high resolution image are 0, ½, ⅜, and ⅞. For example, a horizontal phase shift between the low resolution chroma pixel 55 and the high resolution chroma pixel 651 is 0, and a horizontal phase shift between the low resolution chroma pixel 55 and the high resolution chroma pixel 653 is ½. A vertical phase shift between the low resolution chroma pixel 55 and the high resolution chroma pixel 655 is ⅜, and a vertical phase shift between the low resolution chroma pixel 55 and the high resolution chroma pixel 659 is ⅞.

Figure 7:
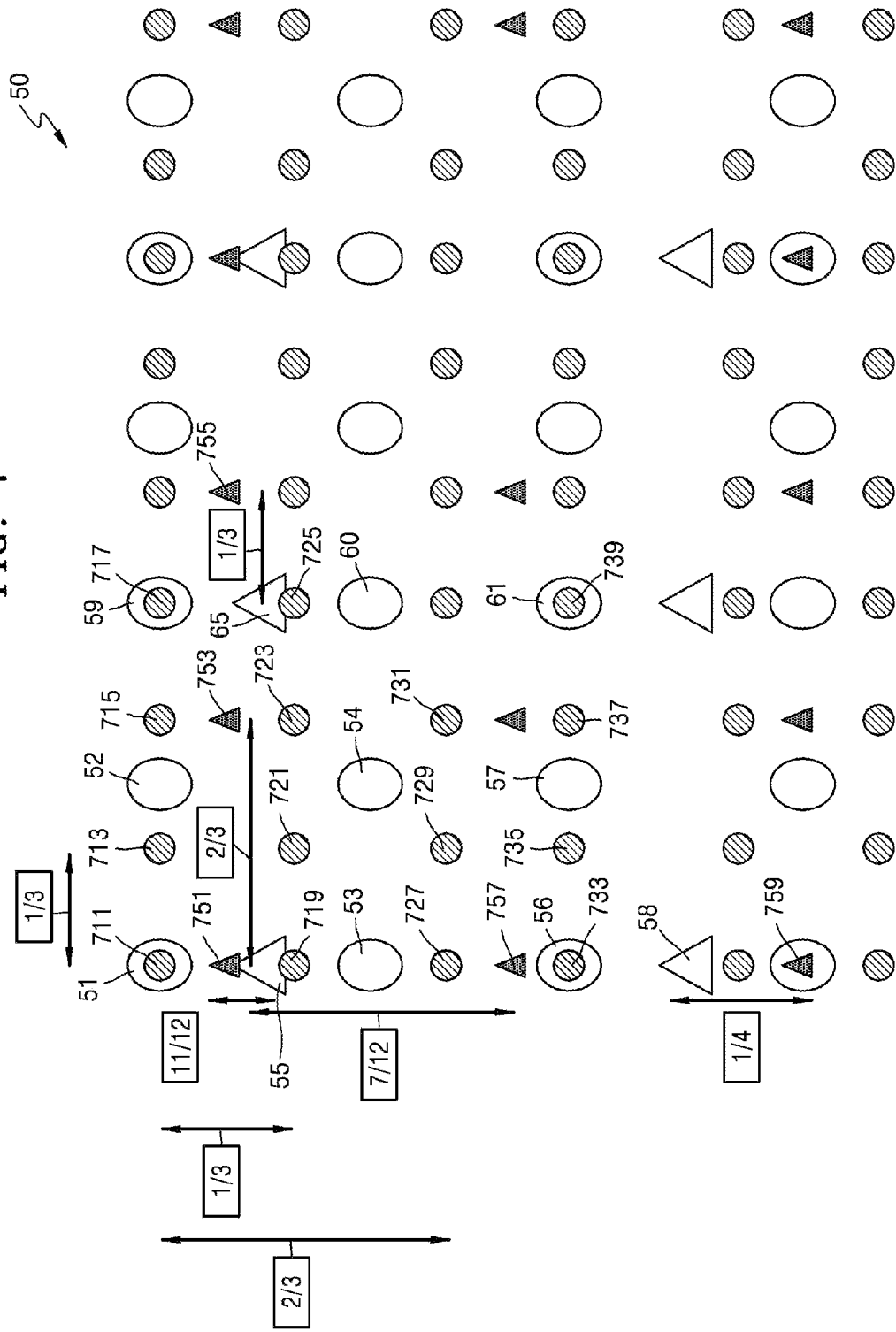
FIG. 7 illustrates a distribution of low and high resolution luma pixels and low and high resolution chroma pixels when a scaling factor between a low resolution image and a high resolution image according to an exemplary embodiment.

FIG. 7 illustrates a distribution of low and high resolution luma pixels and low and high resolution chroma pixels when a scaling factor between the low resolution image 50 and a high resolution image according to an exemplary embodiment.

Low resolution luma pixels 51, 52, 53, 54, 56, 57, 59, 60, and 61 and low resolution chroma pixels 55, 58, and 65 are positioned according to the 4:2:0 color format.

High resolution luma pixels 711, 713, 715, 717, 719, 721, 723, 725, 727, 729, 731, 733, 735, 737, and 739 are positioned based on positions of the low resolution luma pixels 51, 52, 53, 54, 56, 57, 59, 60, and 61 according to an up-sampling ratio of 1.5. High resolution chroma pixels 751, 753, 755, 757, and 759 are positioned based on positions of the high resolution luma pixels 711, 713, 715, 717, 719, 721, 723, 725, 727, 729, 731, 733, 735, 737, and 739 according to the 4:2:0 color format.

In a luma pixel, phase shifts between the low resolution image 50 and the high resolution image are 0, ⅓, and ⅔. For example, a horizontal phase shift between the low resolution luma pixel 51 and the high resolution luma pixel 711 is 0, a horizontal phase shift between the low resolution luma pixel 51 and the high resolution luma pixel 713 is ⅓, and a horizontal phase shift between the low resolution luma pixel 51 and the high resolution luma pixel 715 is ⅔. A vertical phase shift between the low resolution luma pixel 51 and the high resolution luma pixel 711 is 0, a vertical phase shift between the low resolution luma pixel 51 and the high resolution luma pixel 719 is ⅓, and a vertical phase shift between the low resolution luma pixel 51 and the high resolution luma pixel 727 is ⅔.

In a chroma pixel, the phase shifts between the low resolution image 50 and the high resolution image are 0, ⅓, ⅔, ¼, 7/12, and 11/12. For example, a horizontal phase shift between the low resolution chroma pixel 55 and the high resolution chroma pixel 751 is 0, a horizontal phase shift between the low resolution chroma pixel 55 and the high resolution chroma pixel 753 is ⅔, and a horizontal phase shift between the low resolution chroma pixel 65 and the high resolution chroma pixel 755 is ⅓. A vertical phase shift between the low resolution chroma pixel 55 and the high resolution chroma pixel 751 is 11/12, a vertical phase shift between the low resolution chroma pixel 55 and the high resolution chroma pixel 757 is 7/12, and a vertical phase shift between the low resolution chroma pixel 58 and the high resolution chroma pixel 759 is ¼.

The image up-sampling apparatus 10 may perform image up-sampling by determining filters according to phase shifts between a low resolution image and a high resolution image. The image up-sampling apparatus 10 may store filter coefficient sets mapped for phase shifts and select a filter coefficient corresponding to a current phase shift among the stored filter coefficient sets.

A phase shift employs a filter configured as filter coefficients used to determine an accurate interpolation value in a corresponding phase, in order to determine a sampling position and accurately determine a sample value in the sampling position. Thus, filter coefficient sets having good performance may be stored in the image up-sampling apparatus 10. An operation of determining filter coefficient sets for outputting an accurate interpolation value for phase shifts will now be described in detail below.

<Basis for Determining Up-Sampling Filter Coefficients>

Interpolation on pel unit pixels for generating a pixel value of a sampling position may be implemented through up-sampling filtering. Up-sampling filtering is expressed according to the following Equation 2:

$$p(\alpha) = f(\alpha) \times p = \sum_{-M+1}^{M} f_m \cdot p_m$$

A pixel value p(x) generated as a result of interpolation is derived according to a vector p of 2M pel unit reference pixels $\{p_m\}=\{p_{-M+1}, p_{-M+2}, \ldots, p_0, p_1, \ldots, p_M\}$ and a dot product of a vector f(x) of filter coefficients $\{f_m\}=\{f_{-M+1}, f_{-M+2}, \ldots, f_0, f_1, \ldots, f_M\}$. A filter coefficient $f(\alpha)$ is changed according to a sampling position $\alpha$, which determines an interpolation result pixel value $p(\alpha)$, and thus, which up-sampling filter is selected, i.e. how the filter coefficient f(x) is determined, greatly influences the performance of up-sampling filtering.

Methods of generating various up-sampling filters according to various embodiments are based on an operation equation used to generate a floating point number other than an integer and use an absolute value of filter coefficients that is not generally greater than 1. In particular, an operation result of a real number other than the integer may be produced by the sampling position $\alpha$.

Integer-based operation efficiency is higher than a floating point number based operation efficiency. Accordingly, the image up-sampling apparatus 10 according to various exemplary embodiments magnifies filter coefficients to the integer by using an up-sampling ratio, thereby improving the operation efficiency of up-sampling filtering. As a bit depth of a pixel value increases, the accuracy of up-sampling may be improved.

The image up-sampling apparatus 10 may interpolate an image by multiplying a predetermined value to filter coefficients $f_m(\alpha)$ and using filter coefficients $F_m(\alpha)$ having a great value. For example, the filter coefficients $F_m(\alpha)$ may be magnified from the filter coefficients $f_m(\alpha)$ according to the following Equation 3:

$$F_m(\alpha) = \text{int}(f_m(\alpha) \cdot 2^n) \quad \text{[Equation 3]}$$

A scaling rate for operation efficiency may be in the form of $2^n$. n may be 0 and a positive integer. An up-sampling filtering result by a filter coefficient magnified by $2^n$ may be magnified by an n bit in a bit depth compared to a filtering result by an original filter coefficient.

Integer operation up-sampling filtering using the magnified filter coefficients $F_m(\alpha)$ may follow Equation 4 below. That is, a magnified bit depth is reconstructed to an original bit depth after up-sampling filtering is performed by using the magnified filter coefficients $F_m(\alpha)$.

$$p(\alpha) = \left( \sum_{-M+1}^{M} F_m(\alpha) \cdot p_m + \text{offset} \right) \gg n \quad \text{[Equation 4]}$$

In this regard, offset may be $2^{n-1}$.

That is, a filtering result magnified by using a magnified upsampling filter according to various embodiments needs to be reduced by the scaling rate of $2^n$ in order to reconstruct a magnified bit depth to an original bit depth, and thus a bit depth of the magnified filtering result may be reduced by the n bit.

If 2-step up-sampling filtering is performed by 1D up-sampling filtering in a horizontal direction and 1D up-sampling filtering in a vertical direction in serial, the bit depth may be reduced by 2n bits. Thus, when a first 1D up-sampling filter is expanded by an n1 bit, and a second 1D up-sampling filter is expanded by an n2 bit, the bit depth may be reduced by 2n that is a sum of n1 and n2 after performing 2-step up-sampling filtering through first 1D up-sampling filtering and second 1D up-sampling filtering. The first 1D up-sampling filter may be a non-expanded up-sampling filter.

A sum of the up-sampling filter coefficients $f_m(\alpha)$ is 1 as shown in an Equation 5 below.

$$\sum_{-M+1}^{M} f_m(\alpha) = 1 \quad \text{[Equation 5]}$$

A normalization condition for the filter coefficients $F_m(\alpha)$ of the expanded up-sampling filter needs to follow the following Equation 6:

$$\sum_{-M+1}^{M} F_m(\alpha) = 2^n \quad \text{[Equation 6]}$$

However, the normalization condition following Equation 6 may cause an error due to rounding. The image up-sampling apparatus 10 may round off the expanded filter coefficients $F_m(\alpha)$ based on the normalization condition following Equation 6. Some of the expanded filter coefficients $F_m(\alpha)$ for normalization may be adjusted within a predetermined range compared to an original value. For example, the expanded filter coefficients $F_m(\alpha)$ may be adjusted within a range of ±1 to interpolate the round error.

Figure 8:
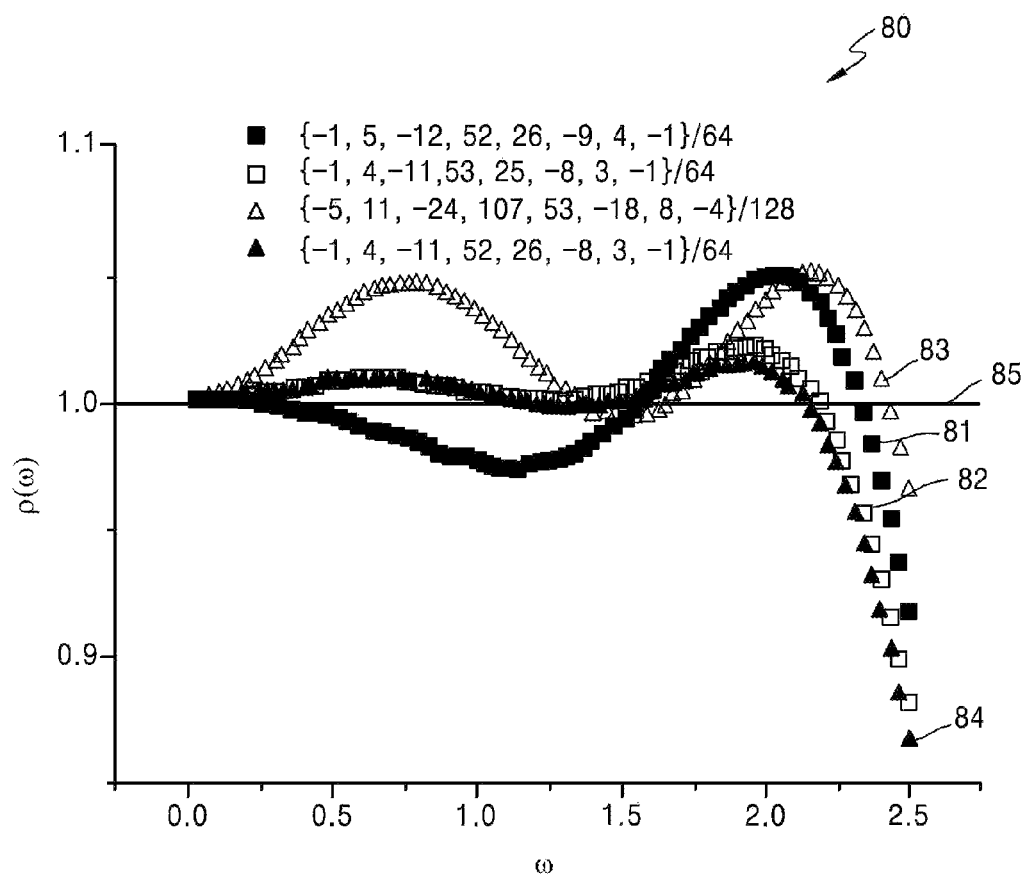
FIGS. 8 and 9 are graphs of frequency response curves for selecting filter coefficients according to exemplary embodiments.
Figure 9:
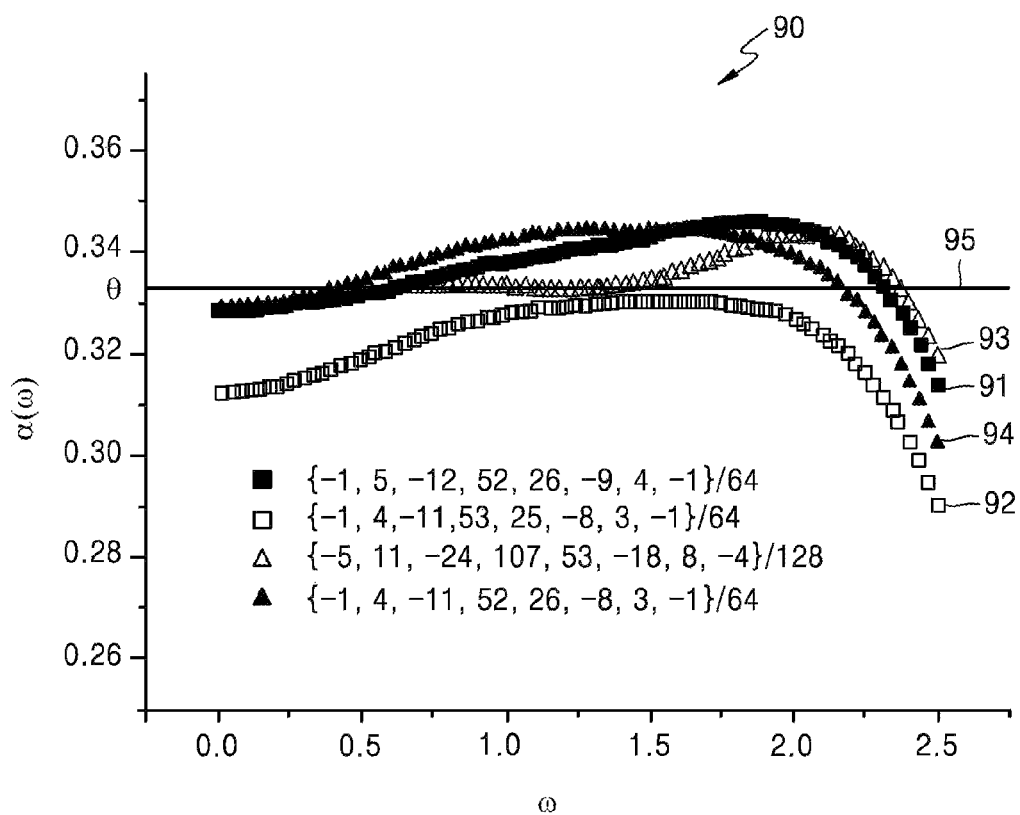

FIGS. 8 and 9 are graphs 80 and 90, respectively, of frequency response curves for selecting filter coefficients according to exemplary embodiments.

Filter coefficient sets that are most suitable for an up-sampling filter may be determined by analyzing a frequency response curve of the up-sampling filter. To determine the frequency response curve of the up-sampling filter, a spectrum analysis with respect to an up-sampling filter coefficient $f_k$ is necessary, and follows Equation 7:

$$\sum_{-M+1}^{M} f_k(\alpha) e^{i\omega k}, e^{i\omega k} \quad \text{[Equation 57]}$$

A frequency response $\rho(\omega)$ of an amplitude region and a frequency response $\alpha(\omega)$ of a phase region may vary according to an input signal frequency $\omega$ of $f_k(\alpha)$.

FIG. 8 is the graph 80 of the frequency response curve of the amplitude region. In the graph 80, a horizontal axis indicates the frequency $\omega$, and a vertical axis indicates the frequency response $\rho(\omega)$. An ideal amplitude 85 of the frequency response $\rho(\omega)$ is 1.

FIG. 9 is the graph 90 of the frequency response curve of the phase region. In the graph 90, a horizontal axis indicates the frequency ω, and a vertical axis indicates the frequency response α(ω). An ideal amplitude 95 of the frequency response α(ω) is θ.

In FIGS. 8 and 9, an amplitude frequency response 81 and a phase frequency response 91 indicated as black squares are frequency response curves of an up-sampling filter configured as filter coefficient sets {−1, 5, −12, 52, 26, −9, 4, −1}/64. An amplitude frequency response 82 and a phase frequency response 92 indicated as white squares are frequency response curves of an up-sampling filter configured as filter coefficient sets {−1, 4, −11, 53, 25, −8, 3, −1}/64. An amplitude frequency response 83 and a phase frequency response 93 indicated as white triangles are frequency response curves of an up-sampling filter configured as filter coefficient sets {−5, 11, −24, 107, 53, −18, 8, −4}/128. An amplitude frequency response 84 and a phase frequency response 94 indicated as black triangles are frequency response curves of an up-sampling filter configured as filter coefficient sets {−1, 4, −11, 52, 26, −8, 3, −1}/64.

To determine a most accurate up-sampling filter among the filter coefficient sets, a filter having the frequency response ρ(ω) of the up-sampling filter that is closer to the ideal amplitude 85 and having the frequency response α(ω) that is closer to the ideal amplitude 95 may be determined.

For example, among the frequency response curves of the up-sampling filters configured as the filter coefficient sets, the filter coefficient set in which an error width ∫|ρ(ω)−1|dω between the frequency response ρ(ω) and the ideal amplitude 85 is the smallest, and an error width ∫|α(ω)−θ|dω between the frequency response α(ω) and the ideal amplitude 95 is the smallest may be selected.

In the frequency ω, the frequency response ρ(ω) may be determined as an absolute value of an output resultant value of Equation 4, i.e. an absolute value of a resultant value of up-sampling filtering, and the frequency response α(ω) may be determined as a value that normalizes a phase of a resultant value of up-sampling filtering as a frequency.

In order for the frequency response ρ(ω) and the frequency response α(ω) to select the smallest filter coefficient set, a filter coefficient set that generates the smallest error width may be determined as the most accurate up-sampling filter by comparing a total error width ∫|ρ(ω)−1|dω+∫|α(ω)−θ|dω of the frequency response curve of a result of performing up-sampling filtering by using each filter coefficient set.

In FIGS. 8 and 9, a target phase shift is 1/3. Among the four filter coefficient sets, because a total error width of the amplitude frequency response 84 and the phase frequency response 94 of a final filter coefficient set is the smallest, a filter coefficient set for the target phase shift of 1/3 may be determined as the final filter coefficient set {−1, 4, −11, 52, 26, −8, 3, −1}/64.

Theoretical phase shifts between a low resolution image pixel and a high resolution image pixel may be determined according to a low resolution image and a high resolution image.

Table 1 below shows phase shifts that may occur during an up-sampling process of each ratio. In this regard, a ratio "xA/B" indicates a "width A of the high resolution image/width B of the low resolution image".

TABLE 1

| Ratio | x2 | x3/2 | x4/3 | x5/3 | x6/5 | x7/6 | x8/7 |
|---|---|---|---|---|---|---|---|
| Theoretical phase shift | 0 | 0 | 0 | 0 | 0 | 0 | 0 |
|  | 1/2 | 2/3 | 3/4 | 3/5 | 5/6 | 6/7 | 7/8 |
|  |  | 1/3 | 1/2 | 1/5 | 2/3 | 5/7 | 6/8 |

TABLE 1-continued

| Ratio | x2 | x3/2 | x4/3 | x5/3 | x6/5 | x7/6 | x8/7 |
|---|---|---|---|---|---|---|---|
|  |  |  | 1/4 | 4/5 | 1/2 | 4/7 | 5/8 |
|  |  |  |  | 2/5 | 1/3 | 3/7 | 4/8 |
|  |  |  |  |  | 1/6 | 2/7 | 3/8 |
|  |  |  |  |  |  | 1/7 | 2/8 |
|  |  |  |  |  |  |  | 1/8 |

FIG. 10 is a table of up-sampling ratios corresponding to a phase shift interval according to exemplary embodiments.

A pixel position of a high resolution image generated by up-sampling a low resolution image according to Equation 1 and a phase shift are determined without a division operation as described above. According to Equation 1, phase shifts that may occur in each sampling position may be determined when performing up-sampling according to a frequently used scaling factor. To the contrary, a sampling position for the high resolution image may be determined after being estimated from a pel unit pixel position of the low resolution image if the phase shift is determined.

FIG. 10 is the table of a relationship of the up-sampling ratios in which phase shifts may occur when the phase shift interval is 1/16.

If the phase shift interval is 1/16, because selectable phase shifts are 16, phase shifts may be mapped to different phase shift indexes. Thus, phase shift index information may be signaled to transmit and receive information indicating which phase shift corresponding to a filter coefficient set is used to perform up-sampling filtering.

A phase shift 0 occurs when up-sampling of all scaling factors is theoretically performed.

A phase shift 1/16 may accurately determine a sampling position necessary for up-sampling of a ratio x16/15.

A phase shift 1/8 (=2/16) may accurately determine a sampling position necessary for up-sampling of a ratio x8/7. Although the sampling position necessary for up-sampling of the ratio x8/7 has an error of about 0.02, compared to a sampling position necessary for up-sampling of a ratio x7/6, because the error is an ignorable value, the phase shift 1/8 may be used in up-sampling of the ratio x7/6.

A phase shift 1/5 (=3/15≈3/16) may accurately determine a sampling position necessary for up-sampling of a ratio x5/3. Although the sampling position necessary for up-sampling of the ratio x5/3 has an error of about −0.03, compared to a sampling position necessary for up-sampling of a ratio x6/5, because the error is an ignorable value, the phase shift 1/5 may be used in up-sampling of the ratio x6/5.

A phase shift 1/4 (=4/16) may accurately determine a sampling position necessary for up-sampling of scaling factors x4/3 and x8/7. Although the sampling position necessary for up-sampling of the scaling factors x4/3 and x8/7 has an error of about 0.04, compared to a sampling position necessary for up-sampling of the ratio x7/6, because the error is an ignorable value, the phase shift 1/4 may be used in up-sampling of the ratio x7/6.

When an up-sampling ratio is 2:3, a sampling position having the phase shift 1/3 is necessary. However, when the phase shift is 1/16, no phase shift index accurately matches the phase shift 1/3. Thus, for the sampling position having the phase shift 1/3, an index of a phase shift 5/16 (≈5/15=1/3) among phase shift indexes may be allocated. That is, the phase shift 1/3 (≈5/16) may accurately determine a sampling position necessary for up-sampling of scaling factors x3/2 and x6/5.

A phase shift 3/8 (=6/16) may accurately determine a sampling position necessary for up-sampling of the ratio x8/7. A phase shift ⅖ (=⁶⁄₁₅≈⁷⁄₁₆) may accurately determine the sampling position necessary for up-sampling of the ratio ×5/3.

A phase shift ½ (=⁸⁄₁₆) may accurately determine sampling positions necessary for up-sampling of scaling factors ×2, ×4/3, ×6/5, and ×8/7.

When a phase shift index i is greater than 8, because a sum of a phase shift θ1 indicated by the phase shift index i and a phase shift θ2 indicated by a phase shift index 16-i is 1, the phase shift index i and the phase shift index 16-i may simultaneously occur in a same up-sampling ratio. Thus, the phase shift θ2 may be used in an up-sampling ratio using the phase shift index i. Therefore, phase shift index i and the phase shift index 16-i may be used in the same up-sampling ratio.

Accordingly, the phase shift ⅗ may be used in up-sampling of the ratio ×5/3 like the phase shift ⅖. The phase shift ⅝ may be used in up-sampling of the ratio ×8/7 like the phase shift ⅜. The phase shift ⅔ may be used in up-sampling of the scaling factors ×3/2 and ×6/5 like the phase shift ⅓. The phase shift ¾ may be used in up-sampling of the scaling factors ×4/3 and ×8/7, like the phase shift ¼. The phase shift ⅘ may be used in up-sampling of the scaling factors ×5/3 and ×6/5, like the phase shift ⅕. The phase shift ⅞ may be used in up-sampling of the scaling factors ×8/7 and ×7/6, like the phase shift ⅛.

According to the table of FIG. 10, if a specific phase shift is necessary in each up-sampling ratio, an up-sampling filter for determining a sampling position indicating a corresponding phase shift is necessary. Eight (8) tap up-sampling filter coefficients for determining a sampling position indicated by phase shifts are shown in FIG. 11 below.

FIG. 11 is a table of the 8 tap up-sampling filter coefficients having a phase shift interval of ¹⁄₁₆ according to exemplary embodiments.

The phase shift index i and a target shift phase indicated by each index are the same as shown in FIG. 10. The filter coefficients of FIG. 11 are values expanded by 64.

A filter coefficient set for a phase shift 0 is {0, 0, 0, 64, 0, 0, 0, 0}.

A filter coefficient set for a phase shift ¹⁄₁₆ is {0, 1, −3, 63, 4, −2, 1, 0}.

A filter coefficient set for a phase shift ⅛ is {−1, 3, −7, 63, 8, −2, 0, 0} or a substantial 7 tap filter coefficient {−1, 2, −5, 62, 8, −3, 1, 0}.

A filter coefficient set for a phase shift ⅕ is {−1, 4, −9, 59, 15, −6, 3, −1} or a substantial 7 tap filter coefficient {−2, 5, −10, 60, 15, −6, 2, 0}.

A filter coefficient set for a phase shift ³⁄₁₆ is {−1, 3, −8, 60, 13, −4, 1, 0}.

A filter coefficient set for a phase shift ¼ is {−1, 4, −10, 58, 17, −5, 1, 0}.

A filter coefficient set for a phase shift ⅓ is {−1, 4, −11, 52, 26, −8, 3, −1}.

A filter coefficient set for a phase shift ⅜ is {−2, 5, −12, 50, 30, −10, 5, −2} or a substantial 7 tap filter coefficient {−1, 3, −9, 47, 31, −10, 4, −1}.

A filter coefficient set for a phase shift ⅖ is {−1, 5, −12, 47, 32, −10, 4, −1}.

A filter coefficient set for a phase shift ⁷⁄₁₆ is {−1, 4, −11, 45, 34, −10, 4, −1}.

A filter coefficient set for a phase shift ½ is {−1, 4, −11, 40, 40, −11, 4, −1}.

As described with reference to FIG. 10 above, the phase shift index i and the phase shift index 16-i may simultaneously occur in up-sampling of a same scaling factor, and filter coefficients for the phase shift index i and filter coefficients for the phase shift index 16-i have an inverse order relationship. For example, the filter coefficients for the phase shift index i may be {−1, 5, −12, 47, 32, −10, 4, −1}, and the filter coefficients for the phase shift index 16-i may be {−1, 4, −10, 32, 47, −12, 5, −1}.

Therefore, the image up-sampling apparatus 10 may store a lookup table of the phase shift index (or phase shifts) and the filter coefficient sets described with reference to FIG. 11 above in the filter coefficient data storage unit 16.

As described with reference to FIGS. 8 and 9, the filter coefficient sets may be determined in such a manner that an error width of a frequency response of an amplitude region of a filtering response and an ideal amplitude 85 may be minimized, and an error width of a frequency response of a phase region of the filtering response and a target phase shift 95 (θ) may be minimized.

The filter coefficient data storage unit 16 may store a lookup table of phase shifts and filter coefficient sets according to a phase shift interval other than ¹⁄₁₆ or a lookup table of filter coefficient sets of which having a different quantity of filter taps and phase shifts.

A phase shift interval may be 2^(−p) (in which p is a positive integer) such as ⅛ or ¹⁄₃₂, other than ¹⁄₁₆. The phase shift interval ⅛ is preferable for small memory. The phase shift interval ¹⁄₃₂ is preferable for an improvement of accuracy.

Thus, the filter selector 14 may determine a necessary phase shift based on a current up-sampling ratio (a scaling factor or a scalability factor), and the filter coefficient data storage unit 16 may select a filter coefficient set corresponding to phase shifts and perform up-sampling filtering for each sampling position indicated by phase shifts.

A scalable video system may encode a low resolution image as a base layer image sequence and a high resolution image as an improvement layer image sequence.

Figure 12A:
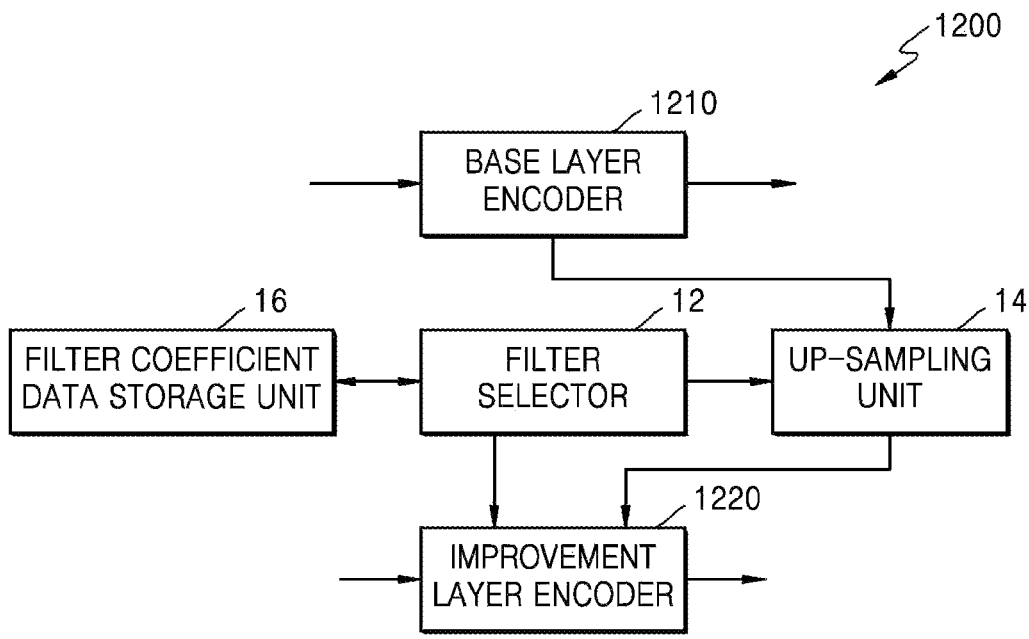
FIG. 12A is a block diagram of a scalable video encoding apparatus, according to an exemplary embodiment.

FIG. 12A is a block diagram of a scalable video encoding apparatus, according to an exemplary embodiment.

The scalable video encoding apparatus 1200 includes a base layer encoder 1210, an improvement layer encoder 1220, a filter selector 12, an up-sampling unit 14, and a filter coefficient data storage unit 16. A redundant description of those elements previous described is omitted.

The scalable video encoding apparatus 1200 may classify and encode a plurality of image streams for each layer according to scalable video coding and may output data encoded for each layer as a separate stream. The scalable video encoding apparatus 1200 may encode base layer image sequences and enhancement layer image sequences according to different layers.

The base layer encoder 1210 may encode base layer images and may output a base layer stream including encoding data of the base layer images.

The improvement layer encoder 1220 may encode improvement layer images and may output an improvement layer stream including encoding data of the improvement layer images.

For example, according to scalable video coding based on spatial scalability, low resolution images may be encoded as base layer images, and high resolution images may be encoded as enhancement layer images. An encoding result of the base layer images may be output in a base layer stream, and an encoding result of the enhancement layer images may be output in an enhancement layer stream.

Scalable video coding may be performed on a base layer and a plurality of improvement layers. In the presence of three or more enhancement layers, base layer images, first enhancement layer images, second enhancement layer images, through $K_{th}$ enhancement layer images may be encoded. Thus, an encoding result of the base layer images may be output in the base layer stream and an encoding result of the first, second, through $K_{th}$ enhancement layer images may be output in first, second, through $K_{th}$ enhancement layer streams, respectively.

The scalable video encoding apparatus 1200 may perform inter prediction for predicting a current image by referring to images of a single layer. Through inter prediction, a motion vector indicating motion information between the current image and a reference image, and a residual between the current image and the reference image may be generated.

The scalable video encoding apparatus 1200 may perform inter-layer prediction for predicting enhancement layer images by referring to the base layer images. The scalable video encoding apparatus 1200 may perform inter-layer prediction for predicting second enhancement layer images by referring to the first enhancement layer images. Through inter-layer prediction, a position differential component between the current image and a reference image of a different layer, and a residual between the current image and the reference image of the different layer may be generated.

When the scalable video encoding apparatus 1200 allows two or more enhancement layers, the video stream encoding apparatus 10 may perform inter-layer prediction between one base layer image and two or more enhancement layer images according to a multi-layer prediction structure.

The inter-layer prediction structure between the base layer sequence and the improvement layer sequence will be described in more detail with reference to FIG. 14.

The scalable video encoding apparatus 1200 encodes each video image for each respective block according to each layer. A block may have a square shape, a rectangular shape, or any geometric shape and is not limited to a data unit having a predetermined size. According to various exemplary embodiments, a block may be a maximum coding unit, a coding unit, a prediction unit, a transformation unit, or the like from among coding units according to a tree structure, as will be discussed below. The maximum encoding unit including coding units having the tree structure is diversely referred to as a coding block unit, a block tree, a root block tree, a coding tree, a coding root or a tree trunk. Video encoding and decoding methods based on coding units having the tree structure will be described with reference to FIGS. 15 through 25.

Inter prediction and inter layer prediction may be performed based on a data unit of the coding unit, the prediction unit, or the transformation unit.

The base layer encoder 1210 may perform source coding operations including inter prediction or intra prediction on the base layer images to generate symbol data. For example, the base layer encoder 1210 may perform inter prediction, or intra prediction, transformation and quantization on samples in a data unit of the base layer images, generate symbol data, perform entropy encoding on the symbol data, and generate a base layer stream.

The improvement layer encoder 1220 may encode the improvement layer images based on the coding units having the tree structure. The improvement layer encoder 1220 may perform inter/intra prediction, transformation and quantization on samples in a data unit of the improvement layer images, generate symbol data, perform entropy encoding on the symbol data, and generate an improvement layer stream.

The improvement layer encoder 1220 may perform inter layer prediction that predicts an improvement layer image by using a reconstructed sample of a base layer image. The improvement layer encoder 1220 may generate an improvement layer prediction image by using a base layer reconstruction image to encode a prediction error between an improvement layer original image and the improvement layer prediction image, in order to encode the improvement layer original image among the improvement layer image sequences through the inter layer prediction structure.

The improvement layer encoder 1220 may perform inter layer prediction on the improvement layer image for each block such as the coding unit or the prediction unit. A block of the base layer image to which a block of the improvement layer image is to refer may be determined. For example, a reconstruction block of the base layer image positioned in correspondence to a position of a current block image in the improvement layer image may be determined. The improvement layer encoder 1220 may determine an improvement layer prediction block by using the base layer reconstruction block corresponding to the improvement layer block.

The improvement layer encoder 1220 may use the improvement layer prediction block determined by using the base layer reconstruction block according to the inter layer prediction structure as a reference image for inter layer prediction of the improvement layer original block.

To determine the improvement layer prediction image (block) by using the base layer reconstruction image (block) in the manner as described above, an up-sampling operation for expanding the base layer reconstruction image to a size of the improvement layer image is necessary.

The scalable video encoding apparatus 1200 may include the filter selector 12, the up-sampling unit 14, and the filter coefficient data storage unit 16 of the image up-sampling apparatus 10. Operations of the filter selector 12, the up-sampling unit 14, and the filter coefficient data storage unit 16 included in the scalable video encoding apparatus 1200 will be described in detail with reference to FIG. 13A below.

Figure 13A:
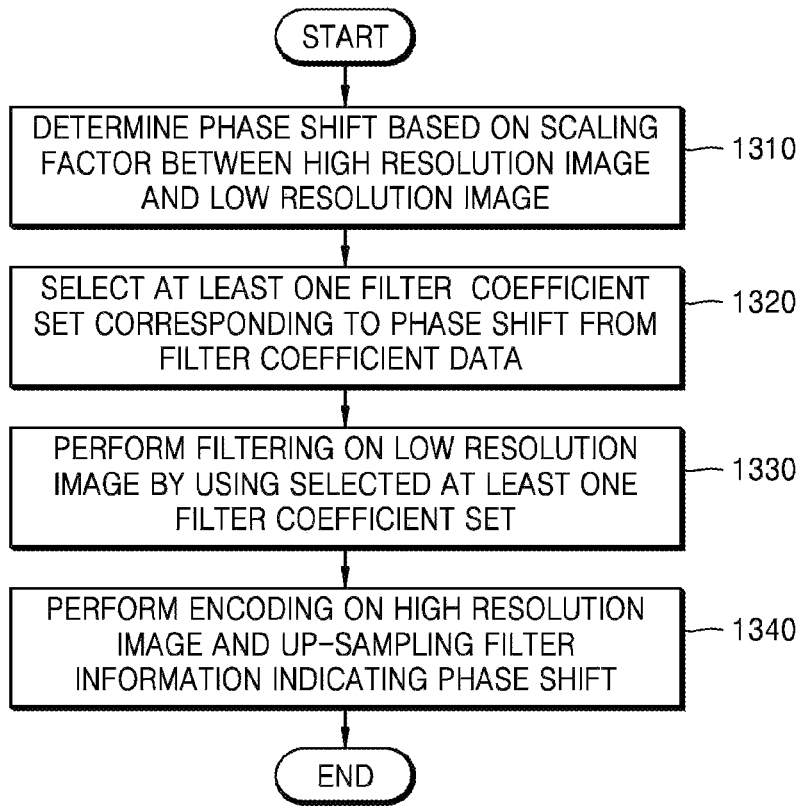
FIG. 13A is a flowchart of a scalable video encoding method, according to an exemplary embodiment.

FIG. 13A is a flowchart of a scalable video encoding method, according to an exemplary embodiment.

The base layer encoder 1210 may determine coding units having a tree structure on a low resolution image of a base layer sequence. The base layer encoder 1210 may perform intra or inter prediction on a prediction unit for each coding unit having the tree structure and may perform transformation and quantization for each transformation unit to encode samples of a coding unit. A base layer bitstream including low resolution encoding information generated by encoding the low resolution image may be output.

The base layer encoder 1210 may perform inverse quantization and inverse transformation on samples encoded for each coding unit based on the transformation unit again and may perform inverse transformation and intra prediction or motion compensation based on the prediction unit to reconstruct each sample. Thus, the base layer encoder 1210 may generate a low resolution reconstruction image.

In operation S1310, the filter selector 12 may determine a phase shift necessary for up-sampling filtering based on a scaling factor between the low resolution image processed by the base layer encoder 1210 and a high resolution image processed by the improvement layer encoder 1220.

In operation S1320, the filter selector 12 may determine a filter coefficient set corresponding to the phase shift by using a lookup table stored in the filter coefficient data storage unit 16. That is, the filter selector 12 may select a filter necessary for a current up-sampling ratio.

In operation S1330, the up-sampling unit 16 may perform filtering on a low resolution reconstruction image generated by the base layer encoder 1210 by using the up-sampling filter selected by the filter selector 12 to generate a high resolution prediction image.

In operation S1340, the improvement layer encoder 1220 may encode a prediction error between the high resolution prediction image and a high resolution original image generated by the up-sampling unit 16 as high resolution encoding information. Up-sampling filter information including information regarding the phase shift used to up-sample the high resolution prediction image from the low resolution image, along with the high resolution encoding information, may be encoded. Thus, the improvement layer encoder 1220 may output an improvement layer bitstream including the high resolution encoding information and the up-sampling filter information.

The up-sampling filter information may be recorded in a sequence parameter set (SPS), a picture parameter set (PPS), and a slice segment header.

The scalable video encoding apparatus 1200 may include a central processor that controls the base layer encoder 1210, the improvement layer encoder 1220, the filter selector 12, the up-sampling unit 14, and the filter coefficient data storage unit 16. Alternatively, the base layer encoder 1210, the improvement layer encoder 1220, the filter selector 12, the up-sampling unit 14, and the filter coefficient data storage unit 16 may operate by their respective processors, and the scalable video encoding apparatus 1200 may generally operate according to interactions of the processors. Alternatively, the base layer encoder 1210, the improvement layer encoder 1220, the filter selector 12, the up-sampling unit 14, and the filter coefficient data storage unit 16 may be controlled according to the control of an external processor of the scalable video encoding apparatus 1200.

The scalable video encoding apparatus 1200 may include one or more data storage units (e.g., memory) in which input and output data of the base layer encoder 1210, the improvement layer encoder 1220, the filter selector 12, the up-sampling unit 14, and the filter coefficient data storage unit 16 is stored. The scalable video encoding apparatus 1200 may include a memory control unit that observes data input and output of the data storage units.

The scalable video encoding apparatus 1200 may operate in connection with an internal video encoding processor or an external video encoding processor to output video encoding results, thereby performing a video encoding operation including transformation. The internal video encoding processor of the scalable video encoding apparatus 1200 may be implemented by a central processor a graphic processor as well as a separate processor.

Figure 12B:
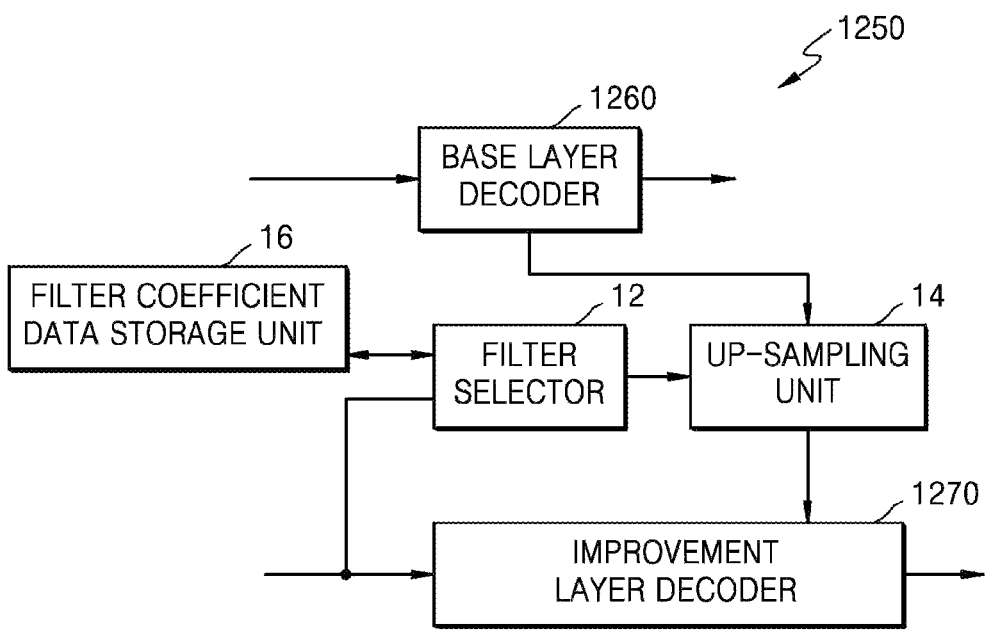
FIG. 12B is a block diagram of a scalable video decoding apparatus, according to an exemplary embodiment.

FIG. 12B is a block diagram of a scalable video decoding apparatus 1250, according to an exemplary embodiment.

The scalable video decoding apparatus 1250 includes the filter selector 12, the up-sampling unit 14, and the filter coefficient data storage unit 16, an improvement layer decoder 1270, and a base layer decoder 1260. A redundant description of those elements previous described is omitted.

The scalable video decoding apparatus 1250 may receive bitstreams for each layer according to scalable encoding. The number of layers of the bitstreams received by the scalable video decoding apparatus 1250 is not limited. However, for convenience of description, an embodiment in which the base layer decoder 1260 of the scalable video decoding apparatus 1250 receives and decodes a base layer stream, and the improvement layer decoder 1270 receives and decodes an improvement layer stream, will be described in detail.

For example, the scalable video decoding apparatus 1250 based on spatial scalability may receive streams in which image sequences of different resolutions are encoded according to different layers. A low resolution image sequence may be reconstructed by decoding a base layer stream, and a high resolution image sequence may be reconstructed by decoding an improvement layer stream.

In the presence of three or more enhancement layers, first improvement layer images on a first improvement layer may be reconstructed from a first improvement layer stream, and, if a second improvement layer stream is further decoded, second improvement layer images may be further reconstructed. If a Kth improvement layer stream is further decoded from the first improvement layer stream, Kth improvement layer images may be further reconstructed.

The scalable video decoding apparatus 1250 may obtain encoded data of base layer images and improvement layer images from the base layer stream and the improvement layer stream and may further obtain a motion vector generated through inter prediction and prediction information generated through inter layer prediction.

For example, the scalable video decoding apparatus 1250 may decode inter-predicted data for each layer and may decode inter layer-predicted data between a plurality of layers. Reconstruction may be performed through motion compensation and inter layer decoding based on a coding unit or a prediction unit according to an embodiment.

Motion compensation for a current image is performed by referring to reconstruction images predicted through inter prediction of a same layer on each layer stream, and thus images may be reconstructed. Motion compensation means an operation of synthesizing a reference image determined by using a motion vector of the current image and a residual of the current image and reconfiguring a reconstruction image of the current image.

The scalable video decoding apparatus 1250 may perform inter-layer decoding with reference to base layer images to reconstruct an improvement layer image predicted through inter-layer prediction. Inter-layer decoding means an operation of synthesizing a reference image of a different layer determined by using the disparity information of the current image and the residual of the current image and reconfiguring the reconstruction image of the current image.

The scalable video decoding apparatus 1250 may perform inter-layer decoding for reconstructing the second improvement layer images predicted with reference to the improvement layer images. An inter layer prediction structure will be described in detail with reference to FIG. 14.

The scalable video decoding apparatus 1250 decodes each image of a video for each block. A block according to an exemplary embodiment may include a maximum encoding unit, an encoding unit, a prediction unit, a transformation unit, etc. among encoding units according to a tree structure.

The base layer decoder 1260 may decode the base layer image by using encoding symbols of a parsed base layer image. If the scalable video decoding apparatus 1250 receives encoded streams based on coding units having a tree structure, the base layer decoder 1260 may perform decoding based on the coding units having the tree structure for each maximum coding unit of the base layer stream.

The base layer decoder 1260 may perform entropy encoding for each maximum coding unit and may obtain encoding information and encoded data. The base layer decoder 1260 may perform inverse quantization and inverse transformation on the encoded data obtained from streams to reconstruct a residual. The base layer decoder 1260 may directly receive a bitstream of quantized transformation coefficients. A residual of the images may be reconstructed as a result of performing inverse quantization and inverse transformation on the quantized transformation coefficients.

The base layer decoder 1260 may reconstruct the base layer images by combining a prediction image and the residual through motion compensation between same layer images.

The improvement layer decoder 1270 may generate an improvement layer prediction image by using samples of a base layer reconstruction image according to the inter layer prediction structure. The improvement layer decoder 1270 may decode the improvement layer stream to obtain a prediction error according to inter layer prediction. The improvement layer decoder 1270 may combine the improvement layer prediction image and the prediction error, thereby generating the improvement layer reconstruction image.

The base layer decoder 1260 may obtain an SAO parameter from the base layer stream to compensate for an encoding error between a base layer original image and the base layer reconstruction image.

In more detail, the base layer decoder 1260 may perform inverse quantization and inverse transformation based on a transformation unit on encoded samples for the coding units having the tree structure of the base layer image and may reconstruct samples through decoding that performs intra prediction or motion compensation based on a prediction unit. The base layer decoder 1260 may reconstruct samples of each maximum coding unit, thereby generating a reconstruction image. A reconstruction image of a previous slice segment may be referred to for inter prediction of a current slice segment. Thus, the reconstruction image of the previous slice segment may be used as a prediction image for the current slice segment.

The improvement layer decoder 1270 may obtain high resolution encoding information from the improvement layer bitstream. A prediction error between an improvement layer prediction block and an improvement layer original block, i.e. a residual, according to the inter layer prediction structure may be obtained from the high resolution encoding information.

The improvement layer decoder 1270 may perform inter layer prediction that reconstructs an improvement layer image by using a reconstructed sample of a base layer image. The improvement layer decoder 1270 may use the improvement layer prediction image generated by using the base layer reconstruction image as a reference image for inter layer prediction, to reconstruct the improvement layer original image among the improvement layer image sequences through the inter layer prediction structure.

The improvement layer decoder 1270 may perform inter layer prediction on the improvement layer image for each block, such as the coding unit or the prediction unit. A block of the base layer image, to which a block of the improvement layer image is to refer, may be determined. For example, a reconstruction block of the base layer image positioned in correspondence to a position of a current block image in the improvement layer image may be determined. The improvement layer decoder 1270 may determine the improvement layer prediction block by using the base layer reconstruction block corresponding to the improvement layer block.

The improvement layer decoder 1270 may use the improvement layer prediction block determined by using the base layer reconstruction block according to the inter layer prediction structure as a reference image for inter layer prediction of the improvement layer original block.

To determine the improvement layer prediction image (block) by using the base layer reconstruction image (block) in the manner as described above, an up-sampling operation for expanding the base layer reconstruction image to a size of the improvement layer image is necessary.

The scalable video decoding apparatus 1250 may include the filter selector 12, the up-sampling unit 14, and the filter coefficient data storage unit 16 of the image up-sampling apparatus 10. Operations of the filter selector 12, the up-sampling unit 14, and the filter coefficient data storage unit 16 included in the scalable video decoding apparatus 1250 will be described in detail with reference to FIG. 13B.

Figure 13B:
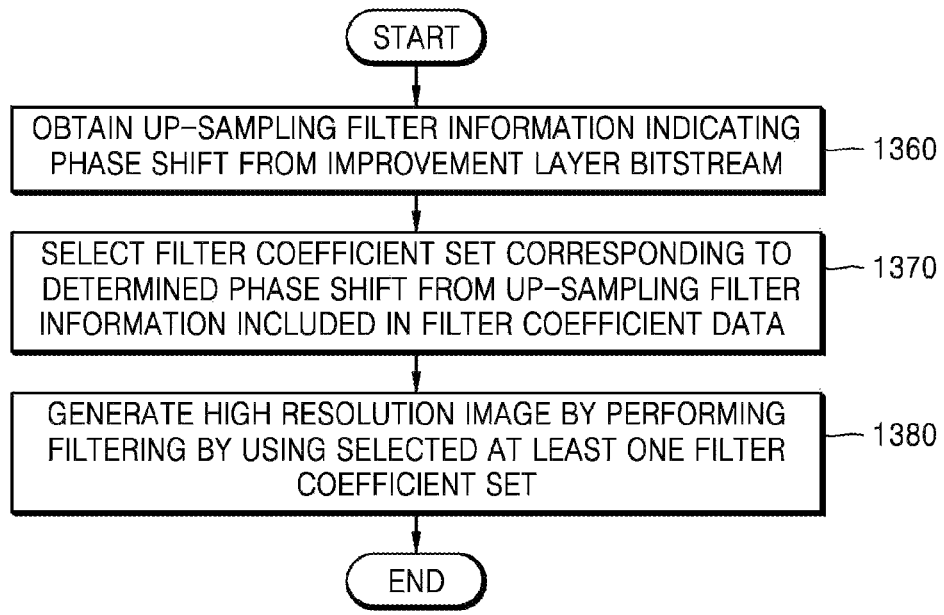
FIG. 13B is a flowchart of a scalable video decoding method, according to an exemplary embodiment.

FIG. 13B is a flowchart of a scalable video decoding method, according to an exemplary embodiment.

The base layer decoder 1260 may obtain low resolution encoding information from a base layer bitstream to determine coding units having a tree structure on a low resolution image of a base layer sequence.

The base layer decoder 1260 may parse symbols from encoding information for each coding unit, may perform inverse transformation and inverse quantization on the symbols based on a transformation unit, and may perform intra prediction or motion compensation based on a prediction unit to reconstruct each sample. Thus, the base layer decoder 1260 may generate a low resolution reconstruction image.

In operation S1360, the improvement layer decoder 1270 may parse an improvement layer bitstream to obtain high resolution encoding information including a prediction error between a high resolution prediction image and a high resolution original image.

The improvement layer decoder 1270 may parse the improvement layer bitstream to obtain up-sampling filter information. The up-sampling filter information including information on a filter used to up-sample a high resolution image from a low resolution image may be transferred to the filter selector 12. The up-sampling filter information may be obtained from an SPS, a PPS, and a slice segment header.

In operation S1370, the filter selector 12 may determine a phase shift necessary for up-sampling filtering based on the up-sampling filter information. The phase shift may correspond to a sampling position necessary for an up-sampling ratio between the low resolution image reconstructed by the base layer decoder 1260 and the high resolution image reconstructed by the improvement layer decoder 1270. The filter selector 12 may determine a filter coefficient set corresponding to the phase shift by using a lookup table stored in the filter coefficient data storage unit 16, thereby selecting a filter necessary for a current up-sampling ratio.

In operation S1380, the up-sampling unit 16 may perform filtering on the low resolution reconstruction image generated by the base layer decoder 1260 by using the up-sampling filter selected by the filter selector 12 to generate a high resolution prediction image. The improvement layer decoder 1270 may combine the inter layer prediction error obtained from the improvement layer bitstream and the high resolution prediction image, thereby generating the high resolution prediction image.

The scalable video decoding apparatus 1250 may include a central processor that generally controls the base layer decoder 1260, the improvement layer decoder 1270, the filter selector 12, the up-sampling unit 14, and the filter coefficient data storage unit 16. Alternatively, the base layer encoder 1260, the improvement layer encoder 1270, the filter selector 12, the up-sampling unit 14, and the filter coefficient data storage unit 16 may operate by their respective processors, and the scalable video decoding apparatus 1250 may operate according to interactions of the processors. Alternatively, the base layer decoder 1260, the improvement layer decoder 1270, the filter selector 12, the up-sampling unit 14, and the filter coefficient data storage unit 16 may be controlled according to the control of an external processor of the scalable video decoding apparatus 1250.

The scalable video decoding apparatus 1250 may include one or more data storage units (e.g., memory) in which input and output data of the base layer decoder 1260, the improvement layer decoder 1270, the filter selector 12, the up-sampling unit 14, and the filter coefficient data storage unit 16 is stored. The scalable video decoding apparatus 1250 may include a memory control unit that observes data input and output of the data storage units.

The scalable video decoding apparatus 1250 may operate in connection with an internal video encoding processor or an external video encoding processor to output video encoding results, thereby performing a video encoding operation including transformation. The internal video encoding processor of the scalable video decoding apparatus 1250 may perform a video encoding operation as a separate processor. The scalable video decoding apparatus 1250, a central processor, or a graphics processor may include a video encoding processing module, thereby performing a video restoring operation.

The scalable video encoding apparatus 1200 described with reference to FIGS. 12A and 13A and the scalable video decoding apparatus 1250 described with reference to FIGS. 12B and 13B may select an accurate up-sampling filter for inter layer prediction.

In order to accurately up-sample a resolution image of a base layer to generate a prediction image for a high resolution image of an improvement layer, sampling positions according to a scalability ratio, i.e. an up-sampling ratio, may be different, and phase shifts between the sampling position and an original pixel position may be different. A filter coefficient for sample the sampling position of a predetermined phase shift may be specified.

Therefore, the scalable video encoding apparatus 1200 and the scalable video decoding apparatus 1250 store corresponding filter coefficient sets for phase shifts and select the filter coefficient sets for phase shifts necessary for a current scalability ratio when up-sampling a base layer reconstruction image to perform filtering, thereby determining a filter value of an accurate sampling position. Thus, an improvement layer prediction image may be accurately generated from the base layer reconstruction image according to the scalability ratio. Therefore, the accurately predicted improvement layer image may be used to more accurately perform inter layer prediction.

An inter layer prediction structure that may be implemented by the base layer encoder 1210 and the improvement layer encoder 1220 of the scalable video encoding apparatus 1200 according to an exemplary embodiment will now be described in detail with reference to FIG. 14.

Figure 14:
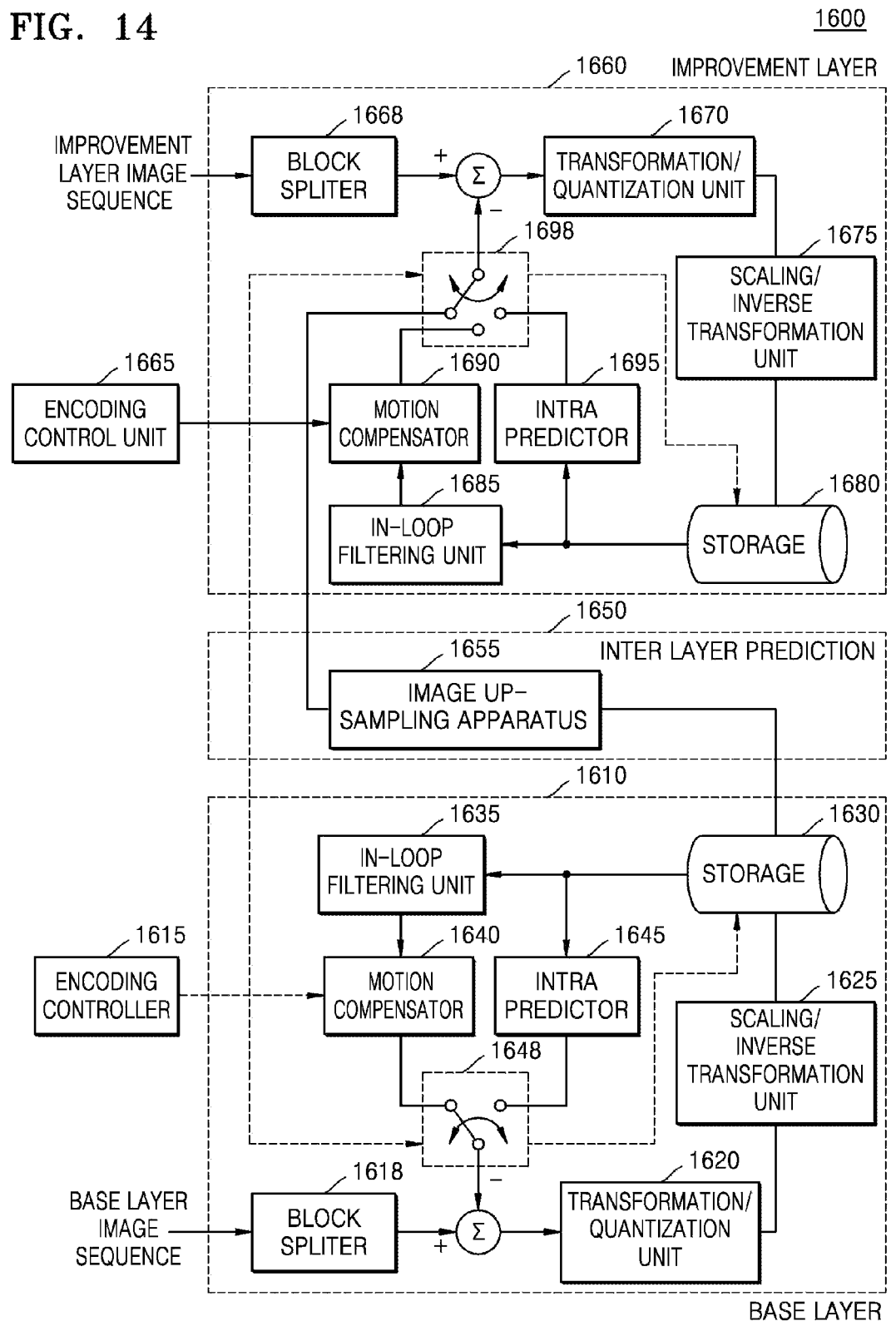
FIG. 14 is a block diagram of a scalable video encoding system, according to an exemplary embodiment.

FIG. 14 is a block diagram of a scalable video encoding system 1600, according to an exemplary embodiment.

The scalable video encoding system 1600 may include a base layer encoding end 1610, an improvement layer encoding end 1660, and an inter-layer prediction end 1650 between the base layer encoding end 1610 and the improvement layer encoding end 1660. The base layer encoding end 1610 and the improvement layer encoding end 1660 may be analyzed as detailed structures of the base layer encoder 1210 and the improvement layer encoder 1220, respectively.

The base layer encoding end 1610 receives an input of a base layer image sequence and encodes each image of the base layer image sequence. The improvement layer encoding end 1660 receives an input of an improvement layer image sequence and encodes each image of the improvement layer image sequence. Operations performed by both the base layer encoding end 1610 and the improvement layer encoding end 1660 will be described later.

Block splitters 1618 and 1668 split the input images (the low resolution image and the high resolution image) into maximum coding units, coding units, prediction units, and transformation units. To encode the coding units output from the block splitters 1618 and 1668, intra prediction or inter prediction may be performed for each prediction unit of the coding units. Prediction switches 1648 and 1698 may perform inter prediction by referring to a previously reconstructed image output from motion compensators 1640 and 1690 or may perform intra prediction by using a neighboring prediction unit of a current prediction unit within a current input image output from intra predictors 1645 and 1695, according to whether a prediction mode of each prediction unit is an intra prediction mode or an inter prediction mode. Residual information may be generated for each prediction unit through inter prediction.

Residual information between the prediction units and peripheral images are input to transformers/quantizers 1620 and 1670 for each prediction unit of the coding units. The transformers/quantizers 1620 and 1670 may perform transformation and quantization for each transformation unit and output quantized transformation coefficients based on transformation units of the coding units.

Scalers/inverse transformers 1625 and 1675 may perform scaling and inverse transformation on the quantized coefficients for each transformation unit of the coding units again and generate residual information of a spatial domain. In a case in which the prediction switch 1648 and 1698 is controlled to the inter mode, the residual information may be combined with the previous reconstructed image or the neighboring prediction unit so that a reconstructed image including the current prediction unit may be generated and a current reconstructed image may be stored in storage units 1630 and 1680. The current reconstructed image may be transferred to the intra predictors 1645 and 1695 and the motion compensators 1640 and 1690 again according to a prediction mode of a prediction unit that is to be subsequently encoded.

In particular, in the inter mode, in-loop filters 1635 and 1685 may perform at least one of deblocking filtering and sample adaptive offset (SAO) operation for compensating for an encoding error between an original image and a reconstruction image on the current reconstructed image stored in the storage units 1630 and 1680 for each coding unit. At least one of the deblocking filtering and the SAO operation may be performed on at least one of the coding units, the prediction units included in the coding units, and the transformation units.

The deblocking filtering is filtering for reducing blocking artifact of data units. The SAO operation is filtering for compensating for a pixel value modified by data encoding and decoding. Data filtered by the in-loop filters 1635 and 1685 may be transferred to the motion compensators 1640 and 1690 for each prediction unit. To encode the coding unit having a next sequence that is output from the block splitters 1618 and 1668 again, residual information between the current reconstructed image and the next coding unit that are output from the motion compensators 1618 and 1668 and the block splitters 1618 and 1668 may be generated.

The above-described encoding operation for each coding unit of the input images may be repeatedly performed in the same manner as described above.

The improvement layer encoding end 1660 may refer to the reconstructed image stored in the storage unit 1630 of the base layer encoding end 1610 for the inter-layer prediction. An encoding control unit 1615 of the base layer encoding end 1610 may control the storage unit 1630 of the base layer encoding end 1610 and transfer the reconstructed image of the base layer encoding end 1610 to the improvement layer encoding end 1660. The transferred base layer reconstruction image may be used as an improvement layer prediction image.

In a case in which a base layer image and an improvement layer image have different resolutions, the image up-sampling apparatus 1655 may up-sample and transfer the base layer reconstructed image to the improvement layer encoding end 1660. Thus, the up-sampled base layer reconstruction image may be used as the improvement layer prediction image. The image up-sampling apparatus 1655 may correspond to the image up-sampling apparatus 10 described with reference to FIGS. 1 through 13B.

In a case in which an encoding control unit 1665 of the improvement layer encoding end 1660 performs inter-layer prediction by controlling the switch 1698, an improvement layer image may be predicted by referring to base layer reconstruction image transferred through the inter-layer prediction end 1650.

For image encoding, diverse coding modes may be set for the coding units, prediction units, and transformation units. For example, a depth or a split flag may be set as a coding mode for the coding units. A prediction mode, a partition type, an intra direction flag, a reference list flag may be set as a coding mode for the prediction units. The transformation depth or the split flag may be set as a coding mode of the transformation units.

The base layer encoding end 1610 may determine a coding depth, a prediction mode, a partition type, an intra direction and reference list, and a transformation depth having the highest coding efficiency according to a result obtained by performing encoding by applying diverse depths for the coding units, diverse prediction modes for the prediction units, diverse partition types, diverse intra directions, diverse reference lists, and diverse transformation depths for the transformation units. However, the exemplary embodiments are not limited to the above-described coding modes determined by the base layer encoding end 1610.

The encoding control unit 1615 of the base layer encoding end 1610 may control diverse coding modes to be appropriately applied to operations of elements. For inter layer encoding of the improvement layer encoding end 1660, the encoding control unit 1615 may control the improvement layer encoding end 1660 to determine a coding mode or residual information by referring to the encoding result of the base layer encoding end 1610.

For example, the improvement layer encoding end 1660 may use the coding mode of the base layer encoding end 1610 as a coding mode of the improvement layer image or may determine the coding mode of the improvement layer image by referring to the coding mode of the base layer encoding end 1610. The encoding control unit 1615 of the base layer encoding end 1610 may control a control signal of the encoding control unit 1615 of the base layer encoding end 1610 and, to determine a current coding mode of the improvement layer encoding end 1660, may use the current coding mode based on the coding mode of the base layer encoding end 1610.

In particular, the improvement layer encoding end 1660 according to an embodiment may encode an inter layer prediction error by using an SAO parameter. Thus, a prediction error between an improvement layer prediction image determined from the base layer reconstruction image and an improvement layer reconstruction image may be encoded as an offset of the SAO parameter.

Similar to the scalable video encoding system 1600 according to the inter-layer prediction method of FIG. 14, a scalable video decoding system according to the inter-layer prediction method may be also implemented. That is, the scalable video decoding system may receive a base layer bitstream and an improvement layer bitstream. A base layer decoding end of the scalable video decoding system may decode the base layer bitstream to generate base layer reconstruction images. An improvement layer decoding end of the scalable video decoding system may decode the improvement layer bitstream by using the base layer reconstruction image and parsed encoding information to generate improvement layer reconstruction images.

If the encoder 12 of the scalable video decoding apparatus 1200 performs inter layer prediction, the decoder 26 of the scalable video decoding apparatus 1250 may also reconstruct multilayer images according to the above described scalable video decoding system.

As described above, in the scalable video encoding apparatus 1200 and the scalable video decoding apparatus 1250, blocks obtained by splitting video data are split into coding units according to a tree structure, and coding units, prediction units, and transformation units are used for inter-layer prediction or inter prediction for a coding unit. Hereinafter, with reference to FIGS. 15A through 25, a method and apparatus for encoding a video and a method and apparatus for decoding a video, based on a coding unit and a transformation unit according to a tree structure will be described.

In principle, during encoding/decoding for multi-layer video, encoding/decoding processes for base layer images and encoding/decoding processes for improvement layer images are separately performed. That is, when inter-layer prediction is performed on a multi-layer video, encoding/decoding results of a single-layer video are referred to each other, but separate encoding/decoding processes are performed for respective single-layer videos.

For convenience of description, because a video encoding process and a video decoding process based on a coding unit according to a tree structure, which will be described with reference to FIGS. 15A through 25, are performed on a single-layer video, only inter prediction and motion compensation will be described. However, as described with reference to FIGS. 12 through 14, inter-layer prediction and compensation between base layer images and improvement layer images are performed to encode/decode a video stream.

When the encoder 12 of the scalable video encoding apparatus 1200 encodes a multi-layer video based on a coding unit according to a tree structure, in order to encode a video for each respective single-view video, the scalable video encoding apparatus 1200 includes as many video encoding apparatuses 100 of FIG. 8 as the number of layers of the multi-layer video in order to encode a video such that each video encoding apparatus 100 may be controlled to encode an assigned single-layer video. In addition, the scalable video encoding apparatus 1200 may perform inter-view prediction by using the encoding results of separate single-views of each video encoding apparatus 100. Thus, the encoder 12 of the scalable video encoding apparatus 1200 may generate a base layer video stream and an improvement layer video stream, in which the encoding results for respective layers are recorded, for each respective hierarchy.

Similarly, when the decoder 26 of the scalable video decoding apparatus 1250 decodes a multi-layer video based on a coding unit according to a tree structure, in order to decode the received base layer video stream and improvement layer video stream for each respective layer, the scalable video decoding apparatus 1250 may include as many video decoding apparatuses 200 of FIG. 9 as the number of layers of the multi-view video and the video decoding apparatuses 200 may be controlled to perform decoding on single-layer videos that are respectively assigned to the video decoding apparatuses 200. In addition, the scalable video decoding apparatus 1250 may perform inter-view compensation by using the decoding result of separate single-layer of each video decoding apparatuses 200. Thus, the decoder 26 of the scalable video decoding apparatus 1250 may generate base layer images and improvement layer images, which are restored for respective layers.

Figure 15A:
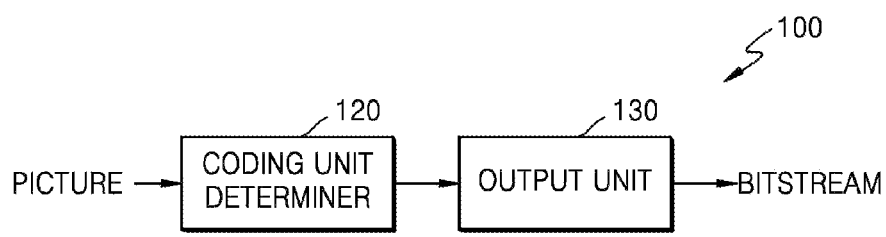
FIG. 15A is a block diagram of a video encoding apparatus based on a coding unit having a tree structure, according to an exemplary embodiment.

FIG. 15A is a block diagram of a video encoding apparatus 100 based on a coding unit having a tree structure, according to an exemplary embodiment.

The video encoding apparatus 100 via video prediction based on a coding unit according to a tree structure includes a coding unit determiner 120 and an output unit 130. Hereinafter, for convenience of description, the video encoding apparatus 100 that uses video prediction based on a coding unit according to a tree structure is referred to as 'the video encoding apparatus 100'.

The coding unit determiner 120 may split a current picture based on a maximum coding unit for the current picture. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length of $2^N$, N being a positive integer.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Because the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the minimum encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, whether to split each of the coding units corresponding to the same depth to a lower depth is determined by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A maximum depth according to an exemplary embodiment may denote the total number of times splitting is performed from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the maximum depth may be set to 4.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Because the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (in which N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a minimum encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similar to the coding unit according to the tree structure, the transformation unit in the coding unit may be recursively split into smaller sized regions and residual data in the coding unit may be divided according to the transformation having the tree structure according to transformation depths.

According to an exemplary embodiment, the transformation unit of the coding unit is obtained by splitting the height and width of the coding unit and a transformation depth indicating the number of times splitting is performed may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having a minimum encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to exemplary embodiments, will be described in detail later with reference to FIGS. 10 through 25.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations because the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a sequence parameter set (SPS) or a picture parameter set (PPS).

In addition, information about a maximum size of a transformation unit and information about a minimum size of a transformation, which are acceptable for a current video may also be output via a header of a bitstream, an SPS or a PPS. The output unit 130 may encode and output reference information, prediction information, and information about a slice type, which are related to prediction.

In the video encoding apparatus 100, the deeper coding unit may be a coding unit obtained by dividing a height or width of a coding unit of an upper depth, which is one level higher than the current depth, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, because encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased because a coding unit is adjusted while considering characteristics of an image while increasing a maximum size of a coding unit while considering a size of the image.

The scalable video encoding apparatus 1200 described with reference to FIG. 12A may include as many video encoding apparatuses 100 as the number of layers in order to encode single-layer images for respective layers of a multi-layer video. For example, the base layer encoder 12 may include a single video encoding apparatus 100 and the improvement layer encoder 14 may include as many video encoding apparatuses 100 as the number of additional views.

When the video encoding apparatus 100 encodes base layer images, the coding unit determiner 120 may determine a prediction unit for inter prediction for each respective coding unit according to a tree structure for each maximum coding unit and may perform inter prediction for each respective prediction unit.

When the video encoding apparatus 100 encodes improvement layer images, the coding unit determiner 120 may also determine a prediction unit and a coding unit according to a tree structure for each maximum coding unit and may perform inter prediction for each respective prediction unit.

The video encoding apparatus 100 may encode an inter layer prediction error for predicting an improvement layer image by using an SAO. Thus, a prediction error of the improvement layer image may be encoded by using information regarding an SAO type and an offset based on a sample value distribution of the prediction error without having to encoding the prediction error for each pixel position.

Figure 15B:
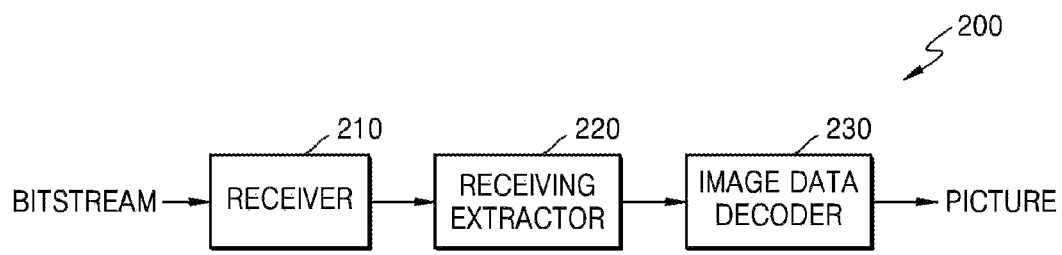
FIG. 15B is a block diagram of a video decoding apparatus based on a coding unit having a tree structure, according to an exemplary embodiment.

FIG. 15B is a block diagram of a video decoding apparatus based on a coding unit having a tree structure, according to an exemplary embodiment.

The video decoding apparatus 200 based on the coding unit according to the tree structure includes a receiver 210, a receiving extractor 220, and an image data decoder 230. Hereinafter, for convenience of description, the video decoding apparatus 200 using video prediction based on a coding unit according to a tree structure will be referred to as the 'video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, an SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bitstream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Because encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit to determine transform units for each coding unit and perform inverse transformation based on transformation units for each coding unit for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained to decode the current coding unit.

The scalable video decoding apparatus 1250 described with reference to FIG. 12B may include as many video decoding apparatuses 200 as the number of views in order to decode the received base layer image stream and improvement layer image stream to restore base layer images and improvement layer images.

When a base layer image stream is received, the image data decoder 230 of the video decoding apparatus 200 may split samples of base view images that are extracted from the base view image stream by the extractor 220 into coding units according to a tree structure of a maximum coding unit. The image data decoder 230 may perform motion compensation on respective prediction units for inter prediction for each respective coding unit according to a tree structure of the samples of the base view images, to restore the base view images.

When an improvement layer image stream is received, the image data decoder 230 of the video decoding apparatus 200 may split samples of additional view images that are extracted from the additional layer image stream by the extractor 220 into coding units according to a tree structure of a maximum coding unit. The image data decoder 230 may perform motion compensation on respective prediction units for inter prediction of the samples of the additional view images to restore the additional view images.

The receiving extractor 220 may obtain an SAO type and an offset from the received improvement layer bitstream and determine an SAO category according to a distribution of sample values for each pixel of an improvement layer prediction image, thereby obtaining an offset for each SAO category by using the SAO type and the offset. Thus, the decoder 230 may compensate for an offset of a corresponding category for each pixel of the improvement layer prediction image without receiving a prediction error for each pixel, and may determine an improvement layer reconstruction image by referring to the compensated improvement layer prediction image.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 16:
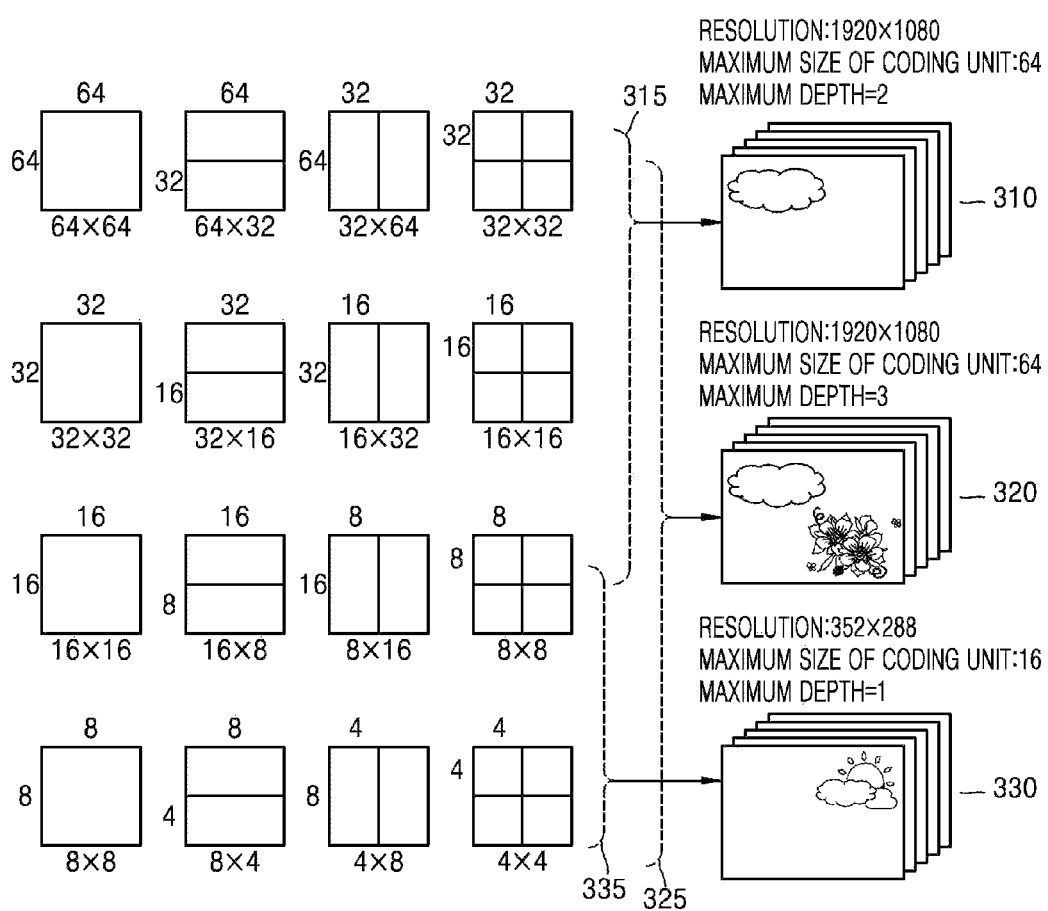
FIG. 16 is a diagram for describing a concept of coding units, according to an exemplary embodiment.

FIG. 16 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 16 denotes a total number of splits from a maximum coding unit to a minimum decoding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having a higher resolution than the video data 330 may be 64.

Because the maximum depth of the video data 310 is 2, coding units 315 of the video data 310 may include a maximum coding unit having a long axis size of 64, and coding units having long axis sizes of 32 and 16 because depths are deepened to two layers by splitting the maximum coding unit twice. Meanwhile, because the maximum depth of the video data 330 is 1, coding units 335 of the video data 330 may include a maximum coding unit having a long axis size of 16, and coding units having a long axis size of 8 because depths are deepened to one layer by splitting the maximum coding unit once.

Because the maximum depth of the video data 320 is 3, coding units 325 of the video data 320 may include a maximum coding unit having a long axis size of 64, and coding units having long axis sizes of 32, 16, and 8 because the depths are deepened to 3 layers by splitting the maximum coding unit three times. As a depth deepens, detailed information may be precisely expressed.

Figure 17A:
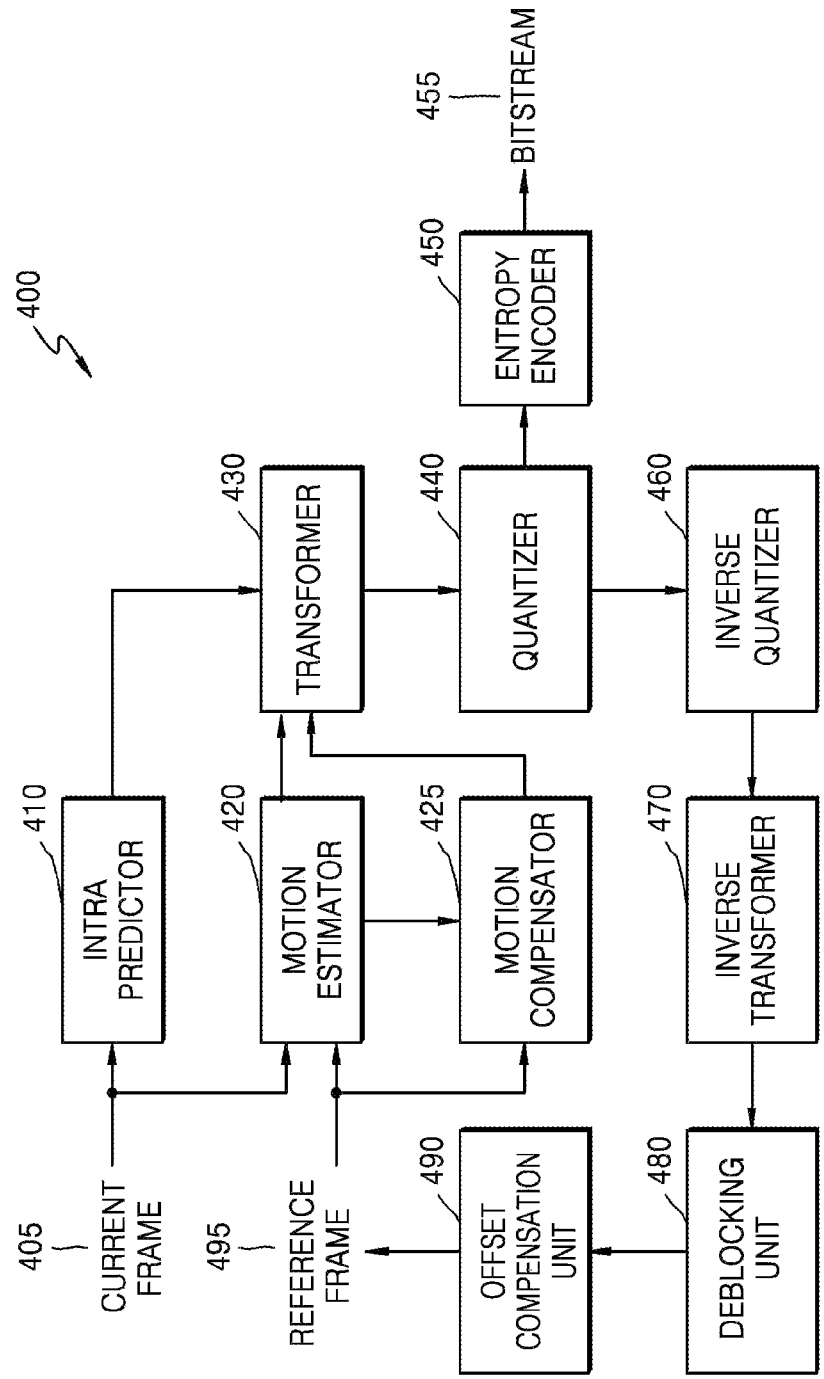
FIG. 17A is a block diagram of an image encoder based on coding units, according to an exemplary embodiment.

FIG. 17A is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as quantized transformation coefficients through a transformer 430 and a quantizer 440. The quantized transformation coefficients are restored as data in a spatial domain through an inverse quantizer 460 and an inverse transformer 470, and the restored data in the spatial domain is output as the reference frame 495 after being post-processed through a deblocking unit 480 and an offset compensation unit 490. The quantized transformation coefficients may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the offset compensation unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 17B:
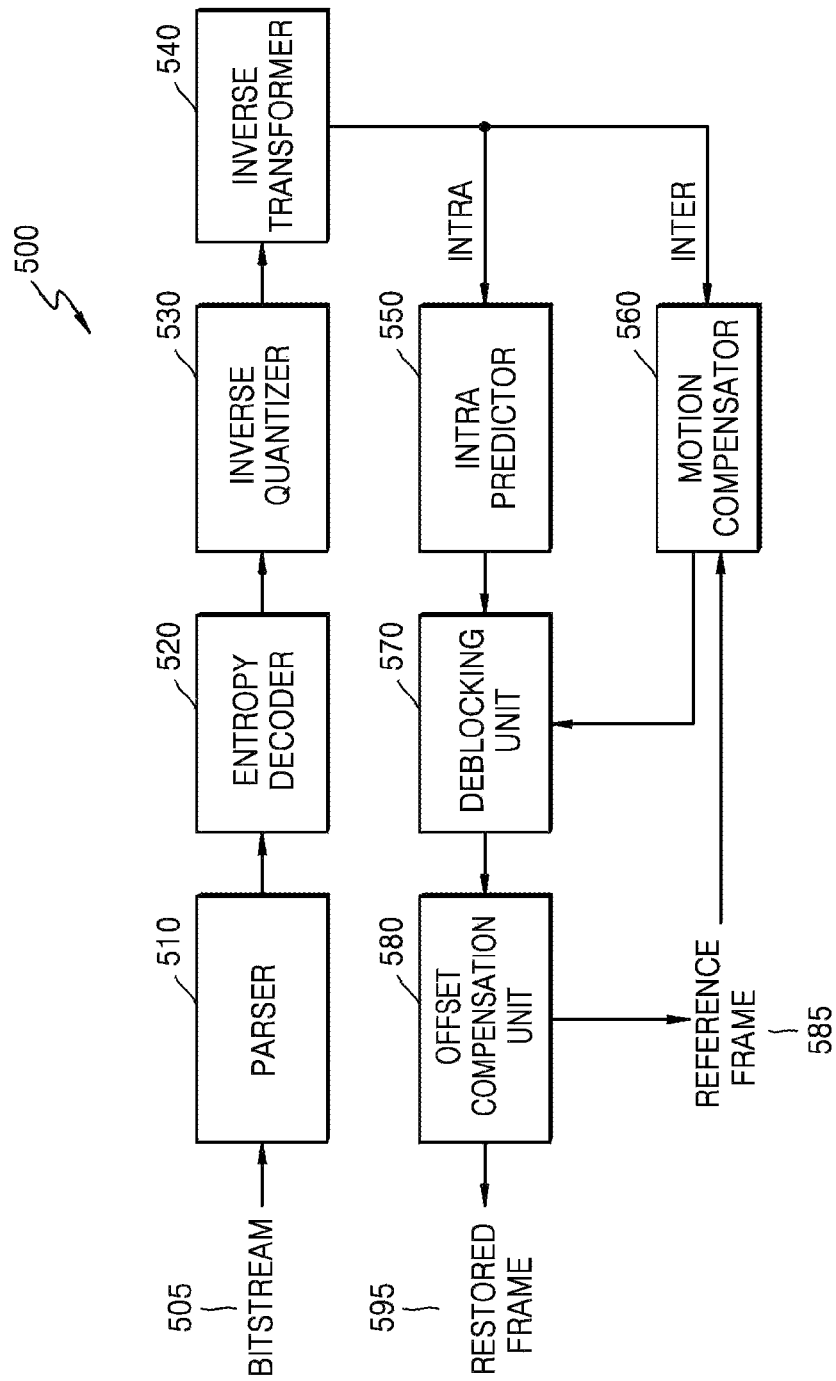
FIG. 17B is a block diagram of an image decoder based on coding units, according to an exemplary embodiment.

FIG. 17B is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and an offset compensation unit 580. Also, the image data that is post-processed through the deblocking unit 570 and the offset compensation unit 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the offset compensation unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

The encoding operation of FIG. 17A and the decoding operation of FIG. 17B describe in detail a video stream encoding operation and a video stream decoding operation in a single layer, respectively. Thus, if the scalable video encoding apparatus 1200 of FIG. 12A encodes a video stream of two or more layers, the image encoder 400 may be provided for each layer. Similarly, if the scalable video decoding apparatus 1250 of FIG. 12B decodes a video stream of two or more layers, the image decoder 500 may be provided for each layer.

Figure 18:
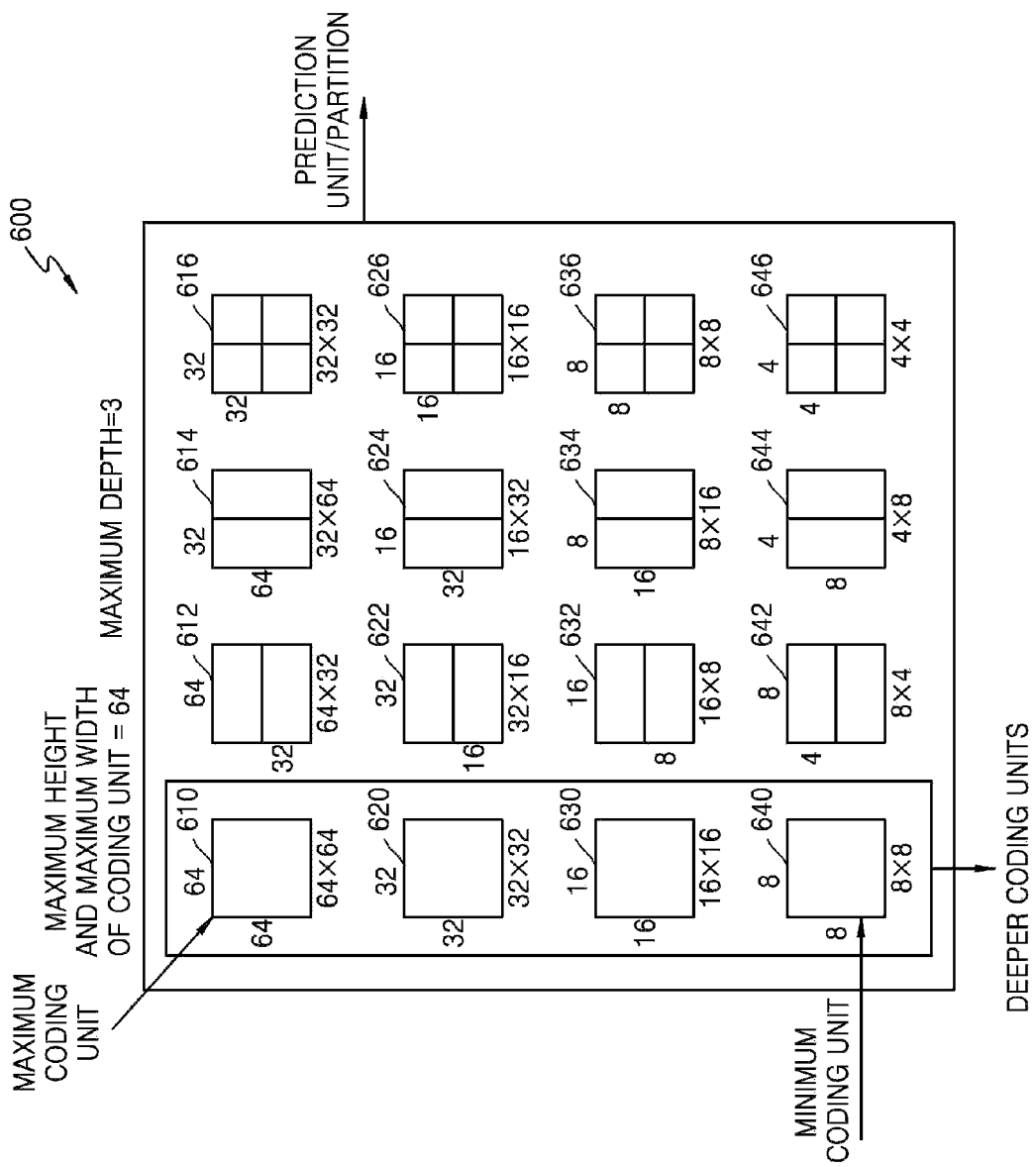
FIG. 18 is a diagram illustrating deeper coding units according to depths, and partitions, according to an exemplary embodiment.

FIG. 18 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Because a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 19:
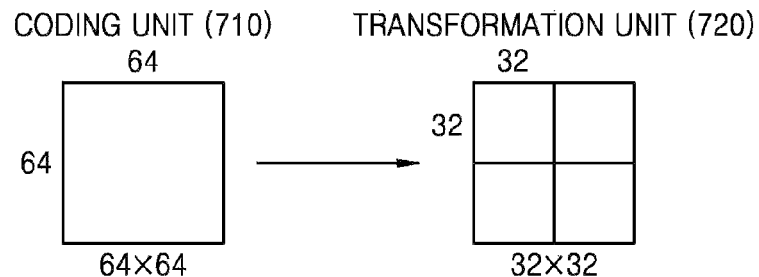
FIG. 19 is a diagram for describing a relationship between a coding unit and transformation units, according to an exemplary embodiment.

FIG. 19 is a diagram for describing a relationship between a coding unit and transformation units, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 20:
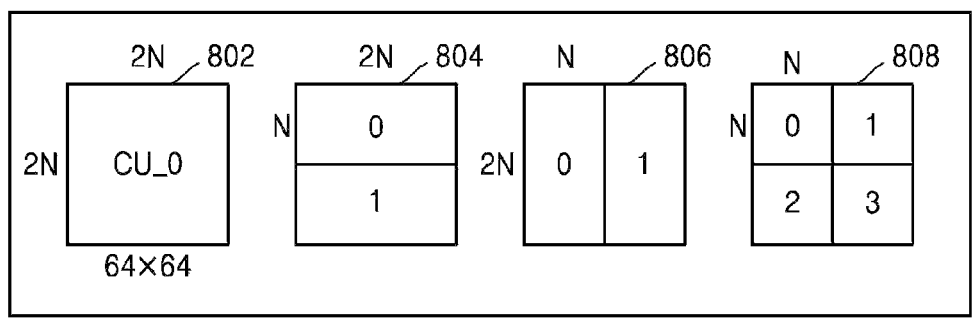
FIG. 20 is a diagram for describing encoding information of coding units corresponding to a coded depth, according to an exemplary embodiment.
Figure 20:
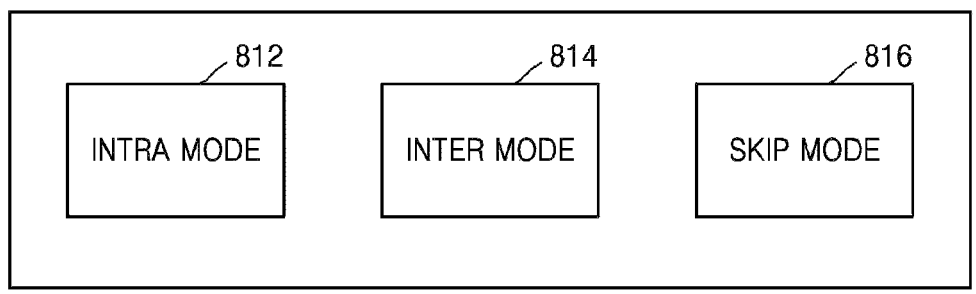
Figure 20:
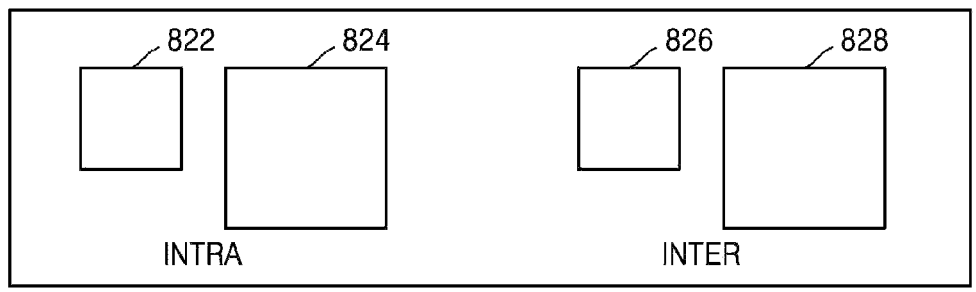

FIG. 20 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 21:
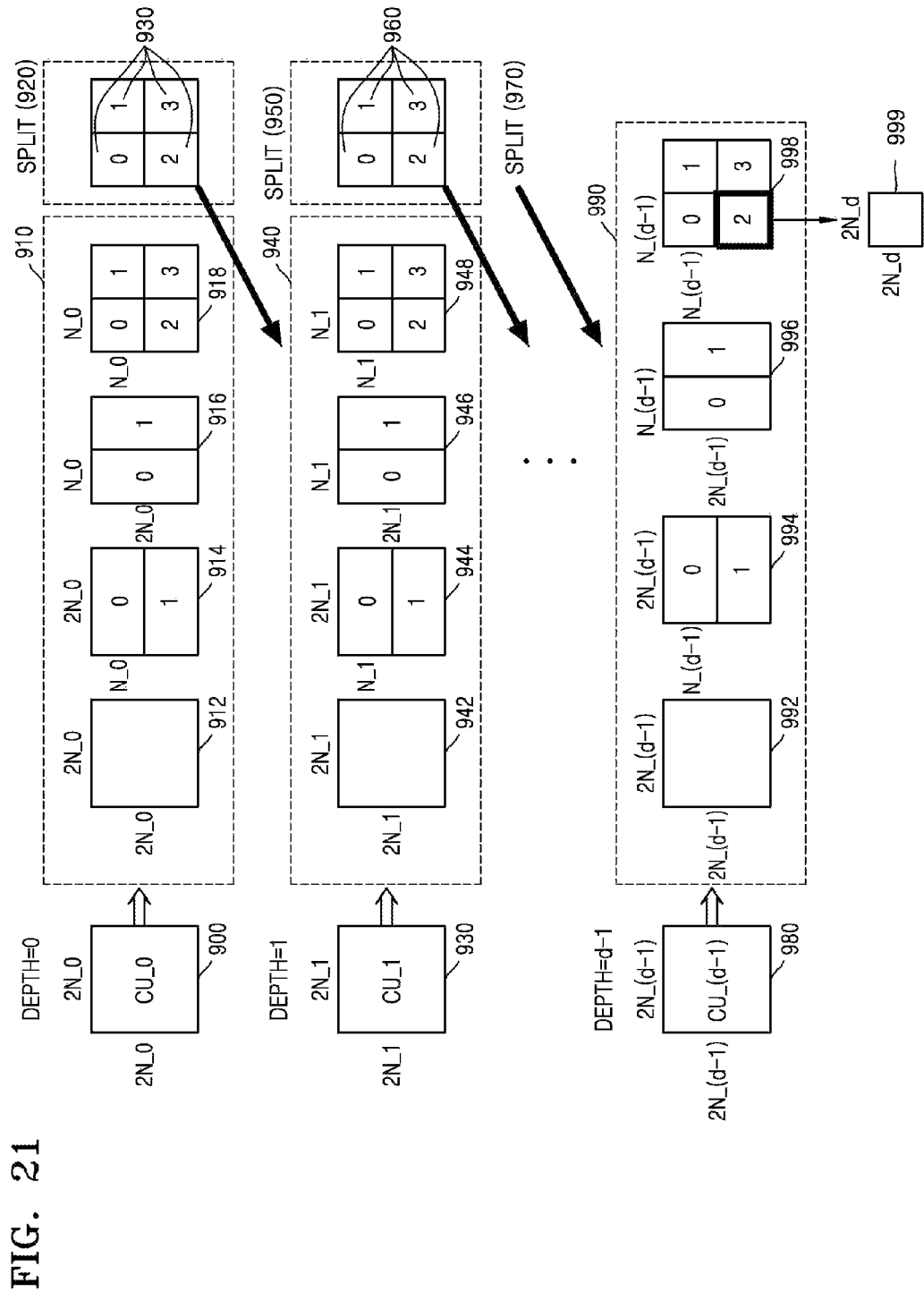
FIG. 21 is a diagram of deeper coding units according to depths, according to an exemplary embodiment.

FIG. 21 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit (CU_0) 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 21 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the minimum encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit (CU_1) 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed until a depth becomes d−1, and split information may be encoded for up to when a depth is one of 0 to d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, because a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, because the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the minimum encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the minimum encoding error may be determined as a coded depth. The coded depth, the partition type of the prediction unit, and the prediction mode may be encoded and transmitted as information about an encoding mode. Also, because a coding unit is split from a depth of 0 to a coded depth, only split information of the coded depth is set to 0, and split information of depths excluding the coded depth is set to 1.

The receiving extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 22:
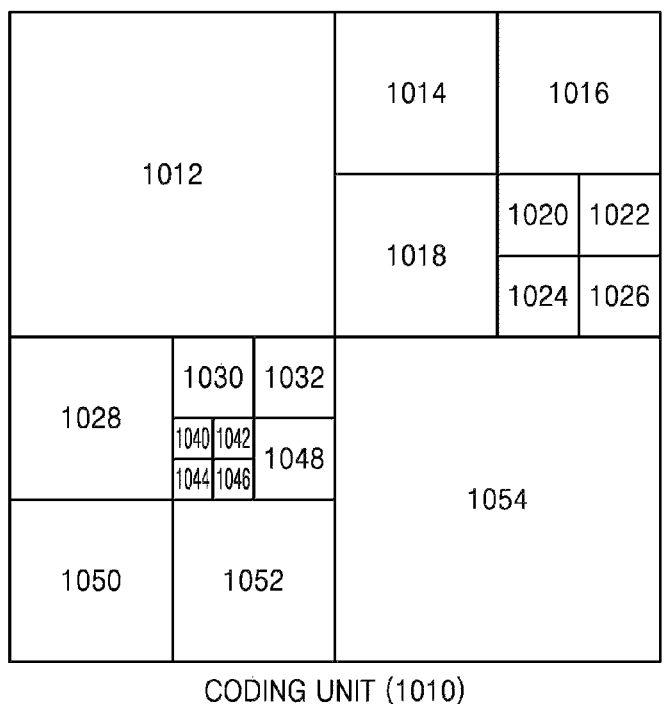
FIGS. 22, 23, and 24 are diagrams for describing a relationship between coding units, prediction units, and transformation units, according to an exemplary embodiment.
Figure 23:
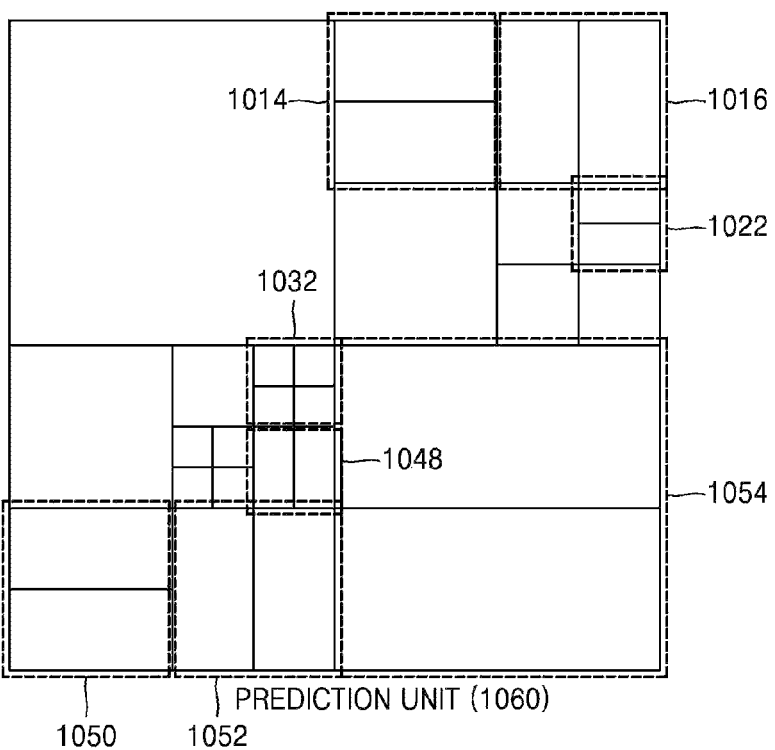
Figure 24:
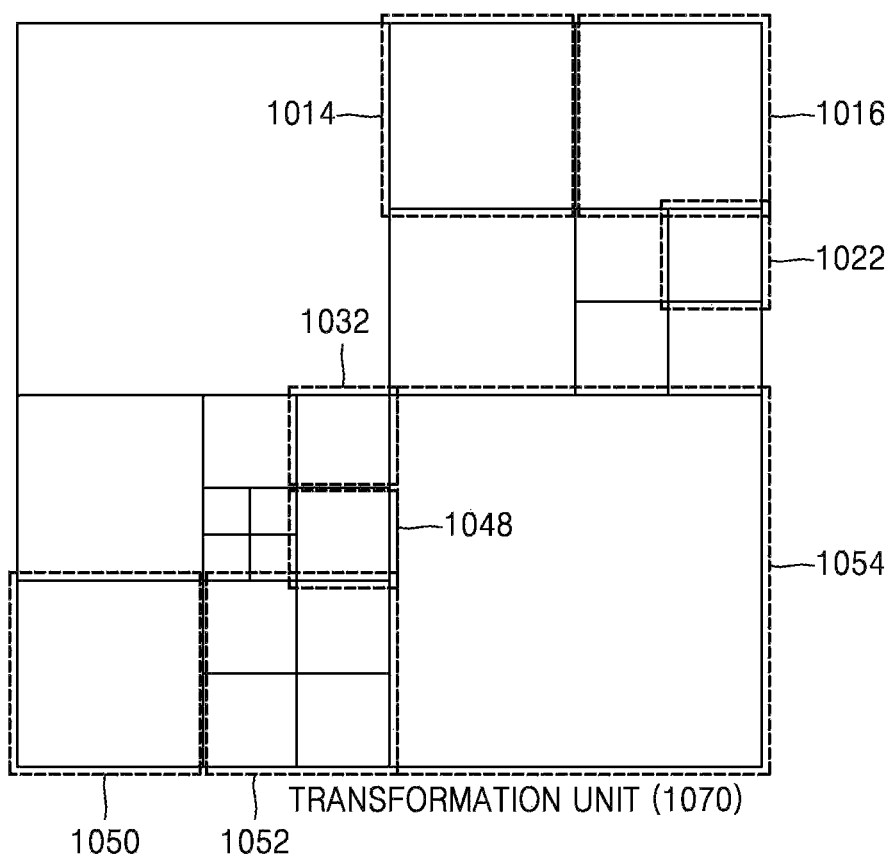

FIGS. 22 through 24 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 2 shows the encoding information that may be set by the video encoding and decoding apparatuses 100 and 200.

according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a

TABLE 2

Split Information 0
(Encoding on Coding Unit having Size of 2N × 2N and Current Depth of d)

| | | | Size of Transformation Unit | | |
|---|---|---|---|---|---|
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 25:
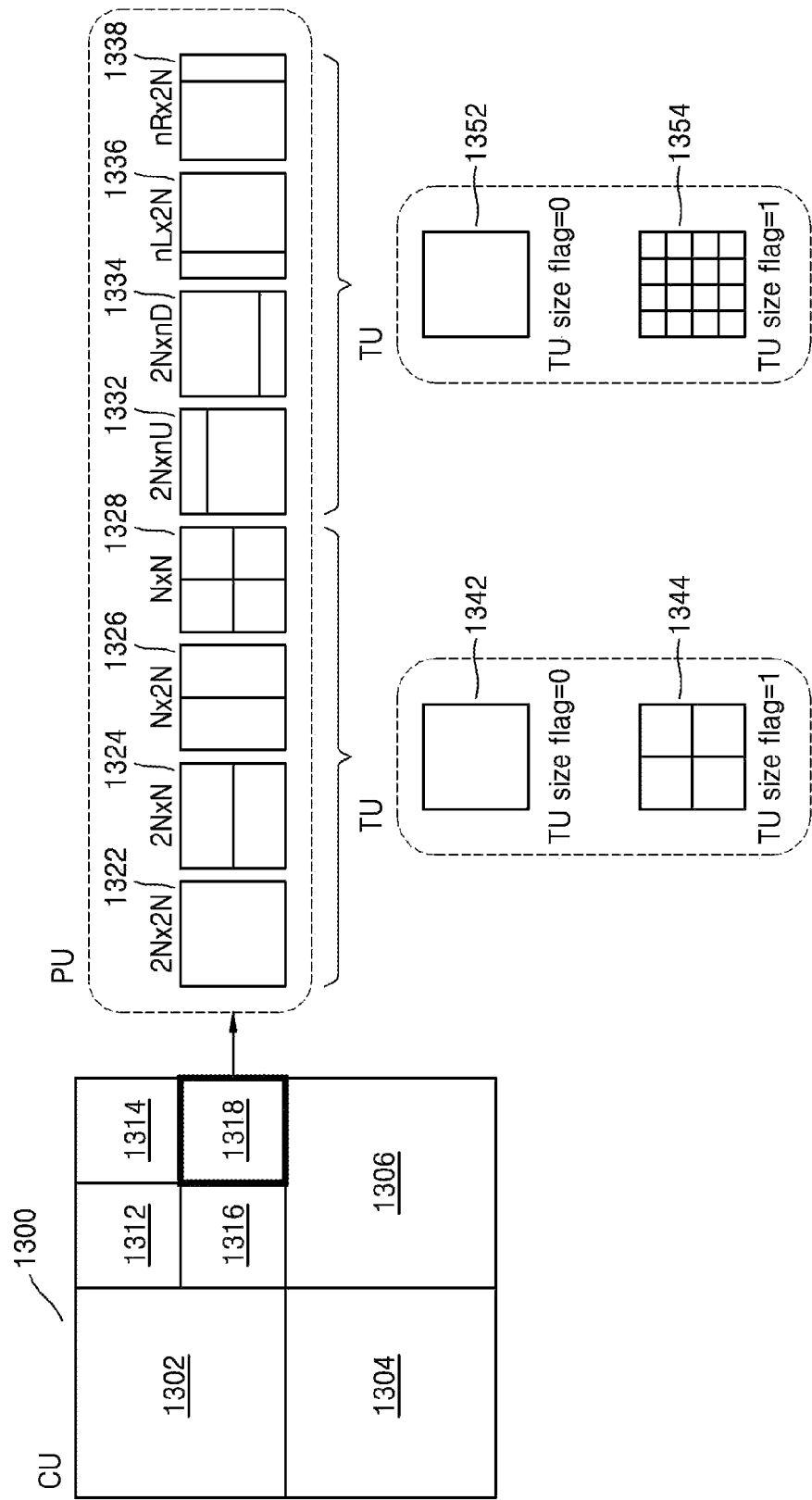
FIG. 25 is a diagram for describing a relationship between a coding unit, a prediction unit or a partition, and a transformation unit, according to encoding mode information an exemplary embodiment.

FIG. 25 is a diagram for describing a relationship between a coding unit, a prediction unit or a partition, and a transformation unit, according to encoding mode information.

The encoding mode information is shown in Table 2. A maximum coding unit 1300 includes coding units 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit) size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, because the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (8):

$$\text{CurrMinTuSize}=\max(\text{MinTransformSize},\text{RootTuSize}/(2^{\wedge}\text{MaxTransformSizeIndex})) \quad (8)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (8), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (29 below. In Equation (9), 'MaxTransformSize' denotes a maximum transformation unit size, and 'PUSize' denotes a current prediction unit size.

$$\text{RootTuSize}=\min(\text{MaxTransformSize},\text{PUSize}) \quad (9)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (10) below. In Equation (10), 'PartitionSize' denotes the size of the current partition unit.

$$\text{RootTuSize}=\min(\text{MaxTransformSize},\text{PartitionSize}) \quad (10)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and exemplary embodiments are not limited thereto.

According to the video encoding method based on coding units having a tree structure as described with reference to FIGS. 15A through 25, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The exemplary embodiments may be implemented as computer programs and may be implemented in general-use digital computers that execute the programs using a computer-readable recording medium. Examples of the computer-readable recording medium include magnetic storage media (e.g., ROM, floppy disks, hard disks, etc.) and optical recording media (e.g., CD-ROMs, or DVDs).

For convenience of description, a scalable video encoding method and/or a video encoding method, which has been described with reference to FIGS. 12A through 25, will be collectively referred to as a 'video encoding method'. In addition, the scalable video decoding method and/or the video decoding method, which has been described with reference to FIGS. 12A through 25, will be referred to as a 'video decoding method'.

A video encoding apparatus including the scalable video encoding apparatus 1200, the video encoding apparatus 100, or the image encoder 400, which has been described with reference to FIGS. 12A through 25, will be referred to as a 'video encoding apparatus'. In addition, a video decoding apparatus including the scalable video decoding apparatus 1250, the video decoding apparatus 200, or the image decoder 500, which has been descried with reference to FIGS. 12A through 25, will be referred to as a 'video decoding apparatus'.

A computer-readable recording medium storing a program, e.g., a disc 260000, according to an exemplary embodiment will now be described in detail.

Figure 26:
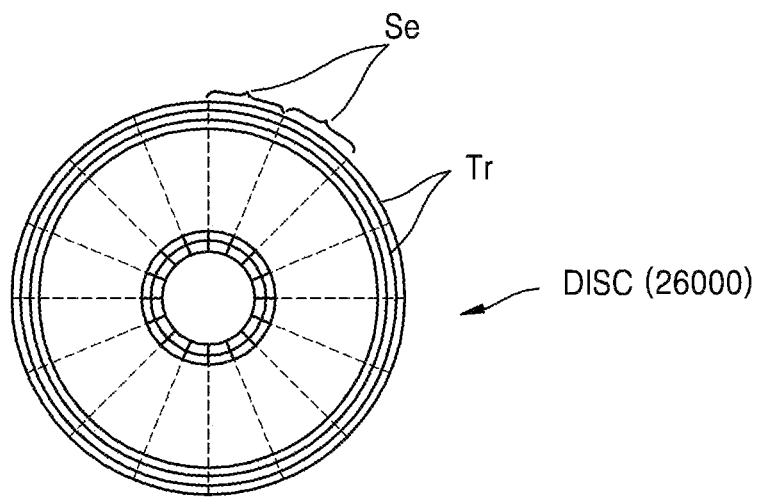
FIG. 26 illustrates a physical structure of a disc that stores a program, according to an exemplary embodiment.

FIG. 26 illustrates a physical structure of a disc 260000 that stores a program, according to an exemplary embodiment.

The disc 260000 which is a storage medium may be a hard drive, a compact disc-read only memory (CD-ROM) disc, a Blu-ray disc, or a digital versatile disc (DVD). The disc 260000 includes a plurality of concentric tracks Tf each being divided into a specific number of sectors Se in a circumferential direction of the disc 260000. In a specific region of the disc 260000, a program that executes a method of determining a quantization parameter, a video encoding method, and a video decoding method as described above may be assigned and stored.

A computer system embodied using a storage medium that stores a program for executing a video encoding method and a video decoding method as described above will now be described with reference to FIG. 22.

Figure 27:
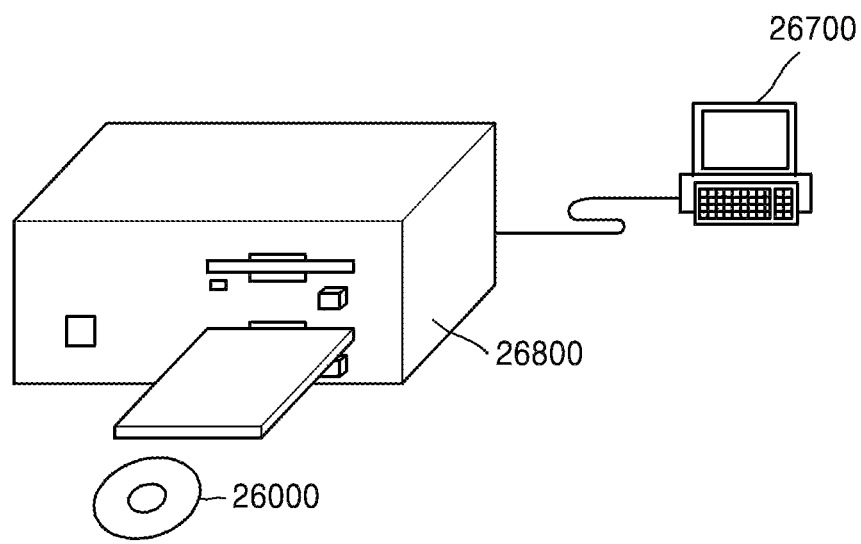
FIG. 27 illustrates a disc drive that records and reads a program by using a disc.

FIG. 27 illustrates a disc drive 26800 that records and reads a program by using a disc 260000.

A computer system 26700 may store a program that executes at least one of a video encoding method and a video decoding method according to an exemplary embodiment, in the disc 260000 via the disc drive 26800. To run the program stored in the disc 260000 in the computer system 26700, the program may be read from the disc 260000 and be transmitted to the computer system 26700 by using the disc drive 26800.

The program that executes at least one of a video encoding method and a video decoding method according to an exemplary embodiment may be stored not only in the disc 260000 illustrated in FIGS. 26 and 27 but also in a memory card, ROM cassette, or a solid state drive (SSD).

A system to which the video encoding method and a video decoding method described above are applied will be described below.

Figure 28:
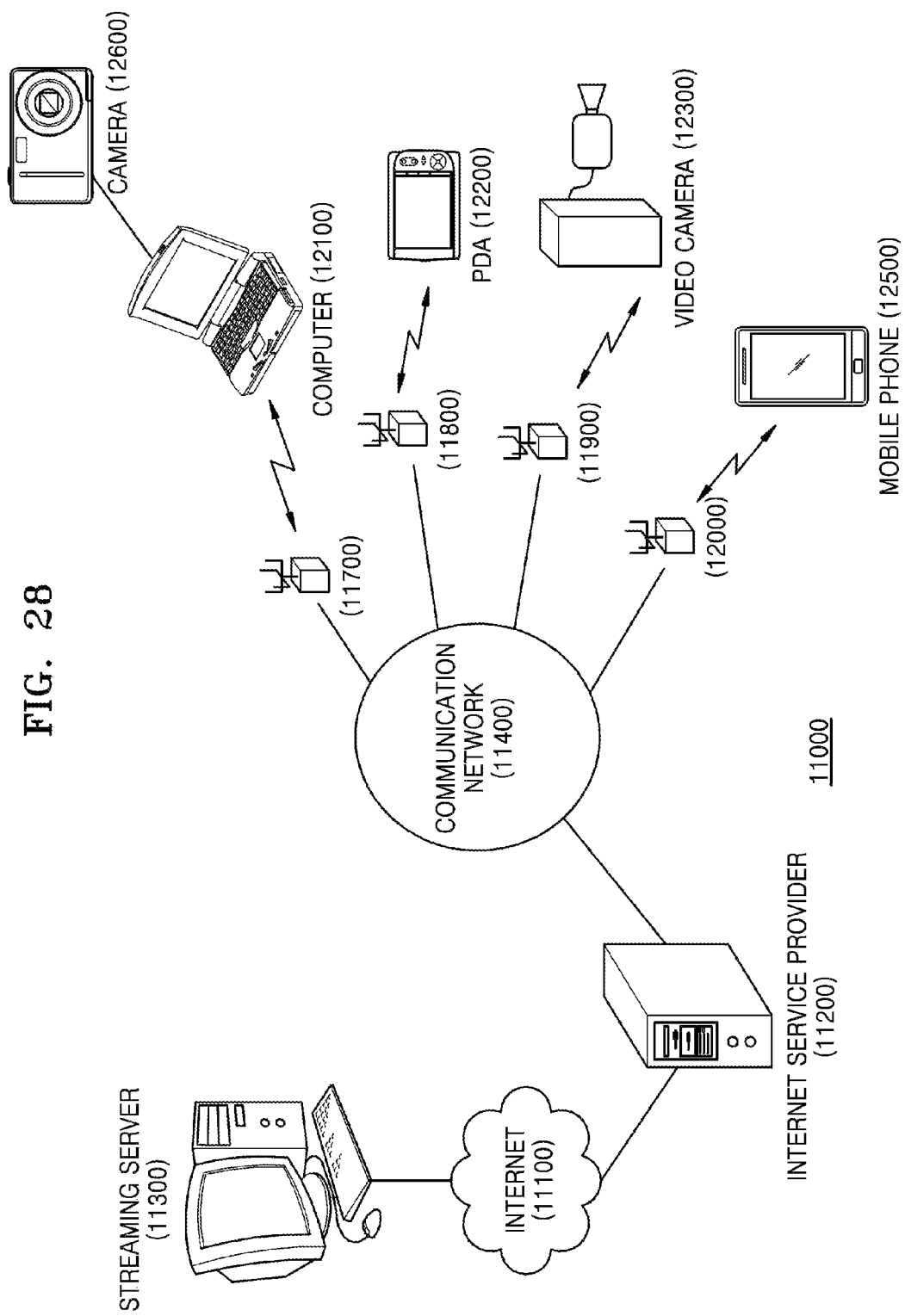
FIG. 28 illustrates an entire structure of a content supply system that provides a content distribution service according to an exemplary embodiment.

FIG. 28 illustrates an entire structure of a content supply system 11000 that provides a content distribution service.

A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to that illustrated in FIG. 24, and devices may be selectively connected thereto. The plurality of independent devices may be directly connected to the communication network 11400, rather than via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding of video may be stored in a computer-readable recording medium, e.g., a CD-ROM disc, a floppy disc, a hard disc drive, an SSD, or a memory card, which may be accessible by the computer 12100.

If video data is captured by a camera built into the mobile phone 12500, the video data may be received from the mobile phone 12500.

The video data may also be encoded by a large scale integrated circuit (LSI) system installed in the video camera 12300, the mobile phone 12500, or the camera 12600.

According to an exemplary embodiment, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 29 and 30.

Figure 29:
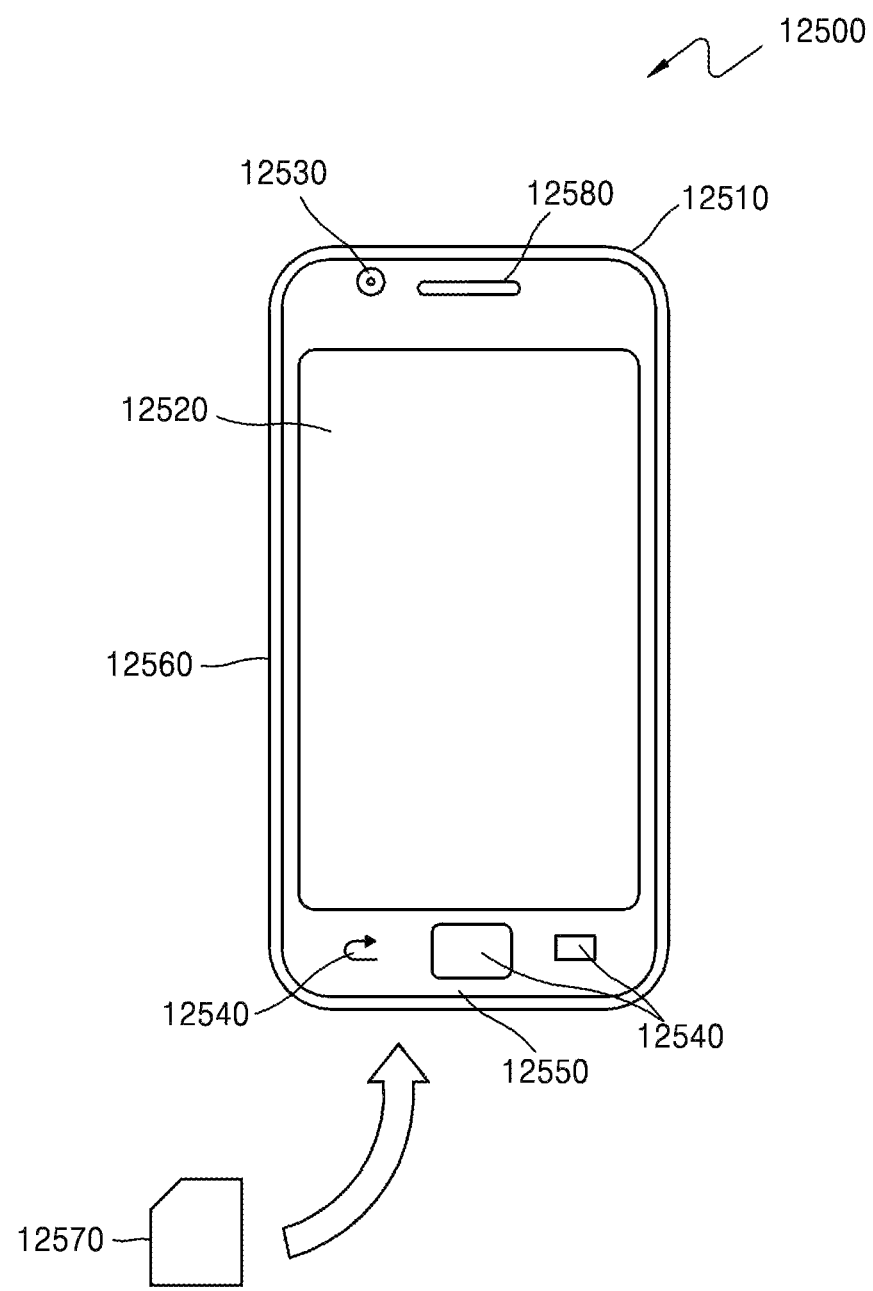
FIGS. 29 and 30 illustrate external and internal structures of a mobile phone to which a video encoding method and a video decoding method are applied, according to an exemplary embodiment.

FIG. 29 illustrates an external structure of a mobile phone 12500 to which a video encoding method and a video decoding method are applied, according to an exemplary embodiment.

The mobile phone 12500 may be a smart phone, the functions of which are not limited and a large part of the functions of which may be changed or expanded.

The mobile phone 12500 includes an internal antenna 12510 via which a radio-frequency (RF) signal may be exchanged with the wireless base station 12000 of FIG. 24, and includes a display screen 12520 for displaying images captured by a camera 1253 or images that are received via the antenna 12510 and decoded, e.g., a liquid crystal display (LCD) or an organic light-emitting diodes (OLED) screen. The smart phone 12510 includes an operation panel 12540 including a control button and a touch panel. If the display screen 12520 is a touch screen, the operation panel 12540 further includes a touch sensing panel of the display screen 12520. The smart phone 12510 includes a speaker 12580 for outputting voice and sound or another type sound output unit, and a microphone 12550 for inputting voice and sound or another type sound input unit. The smart phone 12510 further includes the camera 12530, such as a charge-coupled device (CCD) camera, to capture video and still images. The smart phone 12510 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 30:
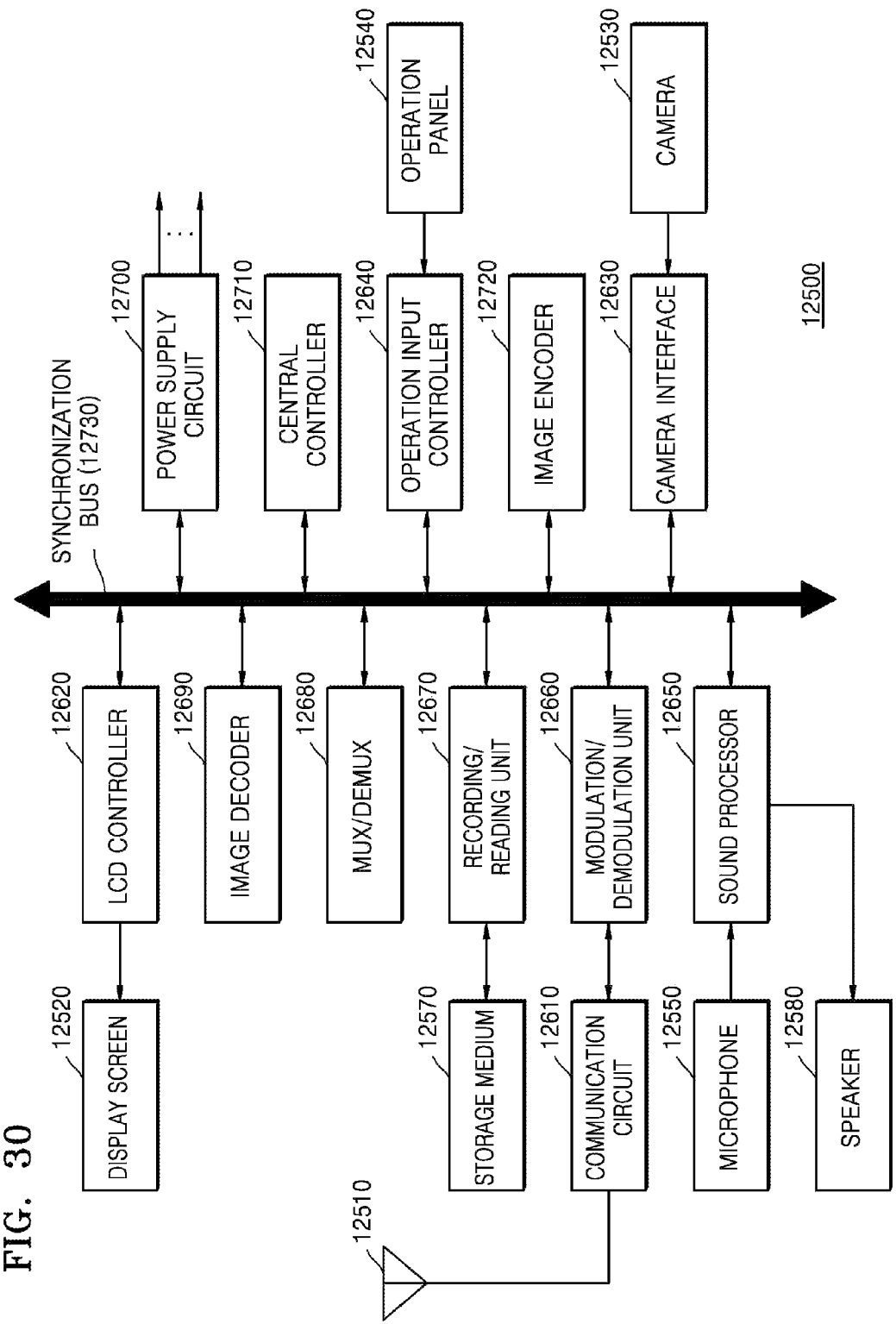

FIG. 30 illustrates an internal structure of the mobile phone 12500, according to an exemplary embodiment.

To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), ROM, and random access memory (RAM).

While the mobile phone 12500 transmits communication data to the outside, a digital signal is generated in the mobile phone 12500 under control of the central controller. For example, the sound processor 12650 may generate a digital sound signal, the image encoding unit 12720 may generate a digital image signal, and text data of a message may be generated via the operation panel 12540 and the operation input controller 12640. When a digital signal is delivered to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 1266 and the sound processor 12650, and the analog sound signal is output via the speaker 12580, under control of the central controller 12710.

When in the data communication mode, data of a video file accessed at an Internet website is received, a signal received from wireless base station 12000 via the antenna 12510 is output as multiplexed data via the modulation/demodulation unit 1266, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 1269 may decode the encoded video data to obtain restored video data and provide the restored video data to the display screen 12520 via the LCD controller 12602, according to the video decoding method described above.

Thus, the data of the video file accessed at the Internet website may be displayed on the display screen 12520. At the same time, the sound processor 1265 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 31:
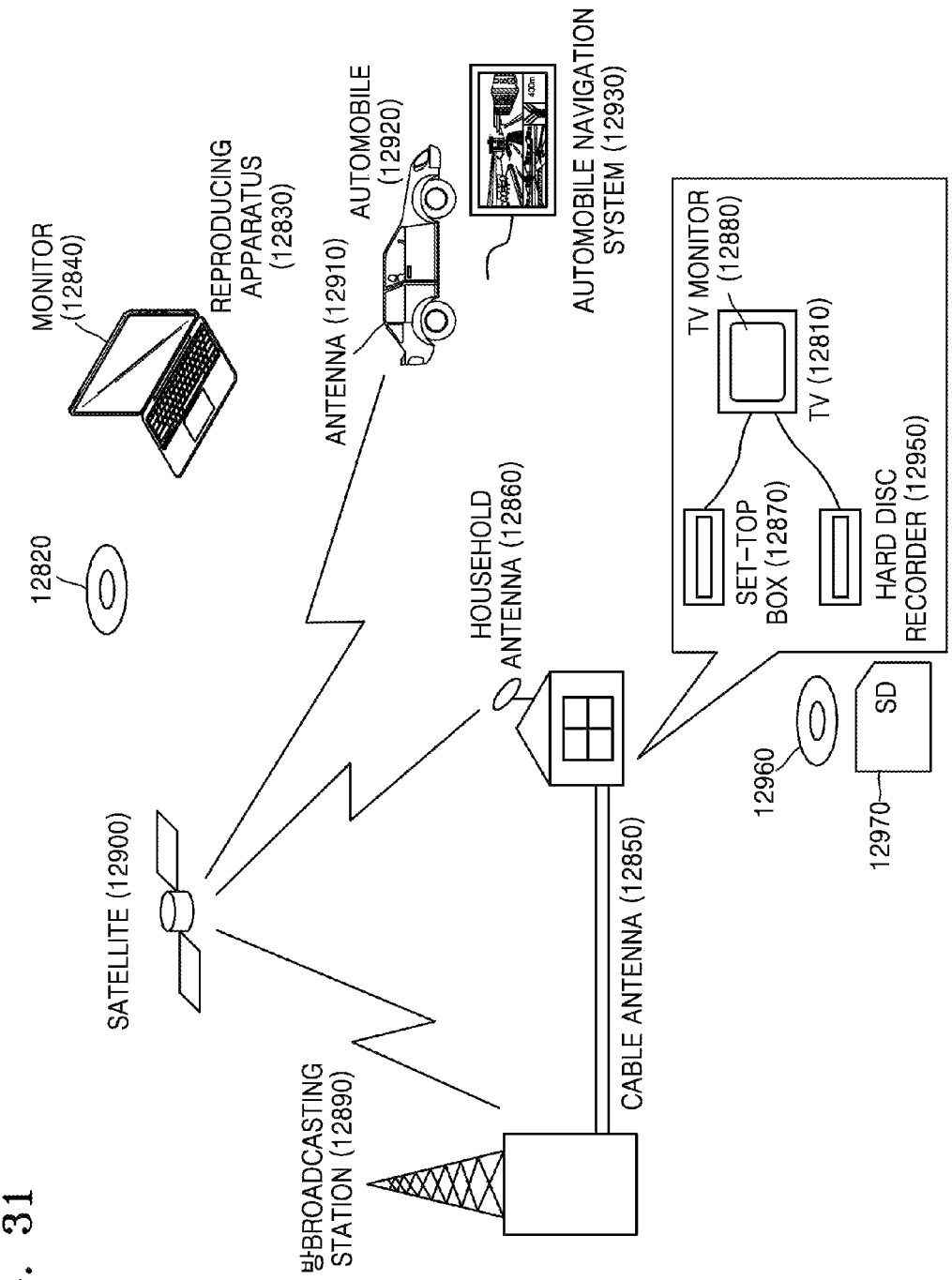
FIG. 31 illustrates a digital broadcasting system employing a communication system, according to an exemplary embodiment.

A communication system according to the exemplary embodiment is not limited to the communication system described above with reference to FIG. 29. For example, FIG. 31 illustrates a digital broadcasting system employing a communication system, according to an exemplary embodiment. The digital broadcasting system of FIG. 31 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 including an appropriate antenna 12910 may receive a signal transmitted from the satellite 12900 or the wireless base station 11700. A decoded video may be reproduced on a display screen of an automobile navigation system 12930 built into the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 31. For example, the computer 12100 and the TV receiver 12810 may not be included in the camera 12530, the camera interface 12630, or the image encoding unit 12720 of FIG. 31.

Figure 32:
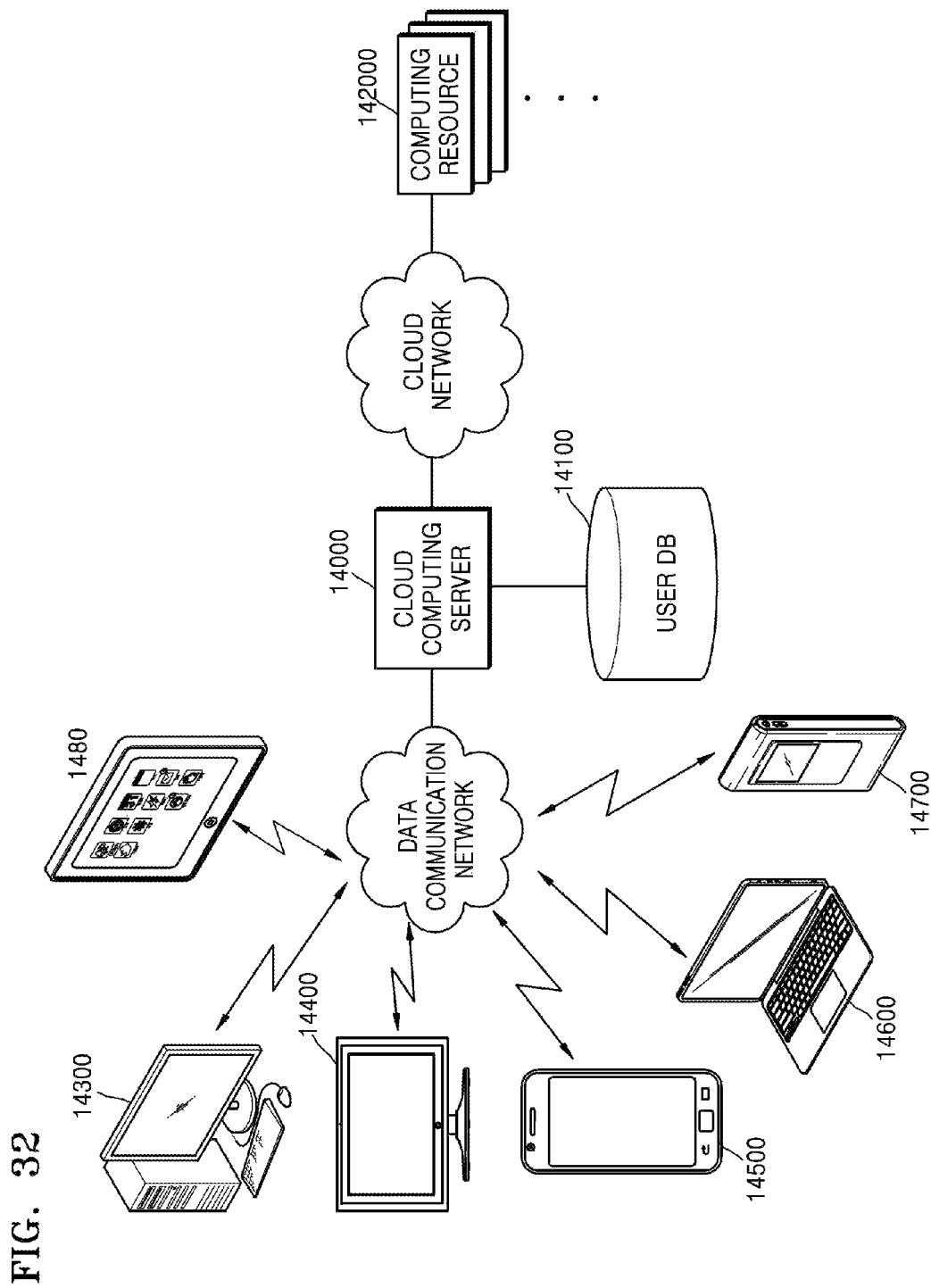
FIG. 32 illustrates a network structure of a cloud computing system using a video encoding apparatus and a video decoding apparatus, according to an exemplary embodiment.

FIG. 32 illustrates a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, storage, an operating system (OS), and security, in his/her own terminal in order to use them, but may select and use desired services from among services in a virtual space generated through the virtualization technology, at a desired point of time.

A user terminal of a specified service user is connected to the cloud computing server 14100 via a data communication network including the Internet and a mobile telecommunication network. User terminals may be provided with cloud computing services, and particularly video reproduction services, from the cloud computing server 14100. The user terminals may be various types of electronic devices capable of being connected to the Internet, e.g., a desk-top PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of the combining. The plurality of computing resources 14200 may include various data services, and may include data uploaded from user terminals. As described above, the cloud computing server 14100 may provide user terminals with desired services by combining video databases distributed in different regions according to the virtualization technology.

User information about users who has subscribed to a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14100, a process of reproducing video by decoding the video data stream is similar to an operation of the mobile phone 12500 described above with reference to FIG. 28.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100 may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 12A through 25. As another example, the user terminal may include a video encoding apparatus as described above with reference to FIGS. 12A through 25. Alternatively, the user terminal may include both the video decoding apparatus and the video encoding apparatus as described above with reference to FIGS. 12A through 25.

Various applications of a video encoding method, a video decoding method, a video encoding apparatus, and a video decoding apparatus according to exemplary embodiments described above with reference to FIGS. 12A through 25 have been described above with reference to FIGS. 26 through 32. However, methods of storing the video encoding method and the video decoding method in a storage medium or methods of implementing the video encoding apparatus and the video decoding apparatus in a device according to various exemplary embodiments, are not limited to the embodiments described above with reference to FIGS. 26 through 32.

While the present disclosure has been particularly shown and described with reference to exemplary embodiments thereof, it will be understood by those of ordinary skill in the art that various changes in form and details may be made therein without departing from the spirit and scope according to the present disclosure as defined by the following claims.

The invention claimed is:

1. An up-sampling method for scalable video decoding, the up-sampling method comprising:

obtaining, from an improvement layer bitstream, information indicating a value of a phase shift for an up-sampling filter, wherein the value of a phase shift is a pixel displacement between a pixel in a pixel unit of a low resolution image and a pixel in a sub-pixel unit of a high resolution image and the pixel in a sub-pixel unit of a high resolution image is determined by up-sampling based on a scaling factor between the high resolution image and the low resolution image;

selecting at least one filter coefficient set corresponding to the determined value of a phase shift from the information indicating the value of a phase shift for an up-sampling filter, included in filter coefficient data comprising corresponding filter coefficient sets for values of phase shifts; and generating the high resolution image by performing filtering on the low resolution image by using the selected at least one filter coefficient set, wherein the information indicating a value of a phase shift for an up-sampling filter is signaled via a picture parameter set (PPS) included in the improvement layer bitstream, the selecting at least one filter coefficient set comprises selecting a filter coefficient set corresponding to a first phase shift among sets of filter coefficients for up-sampling for a sampling position having the second phase shift, the sets of filter coefficients comprises filter coefficients for sub-pixel positions whose denominator is 2 to the power of n, the first phase shift is one from among the sub-pixel positions whose denominator is 2 to the power of n, and the second phase shift is a sub-pixel position whose denominator is not 2 to the power of m and whose numerator is 1, and wherein n and m are integers, and the first phase shift is different from the second phase shift.

2. The up-sampling method of claim 1, wherein the selecting at least one filter coefficient set comprises: when the filter coefficient data comprises filter coefficient sets corresponding to the values of phase shifts according to a phase shift interval $1/16$, performing filtering by using i) a filter coefficient set corresponding to a phase shift $5/16$ in the filter coefficient data for up-sampling for the sampling position having the phase shift of $1/3$ when the ratio is 2:3 and ii) a filter coefficient set corresponding to a phase shift $11/16$ in the filter coefficient data for up-sampling for a sampling position having a determined phase shift of $2/3$ when the ratio is 2:3.

3. The up-sampling method of claim 1, wherein the selecting at least one filter coefficient set comprises: when the filter coefficient data comprises filter coefficient sets corresponding to the values of phase shifts according to a phase shift interval $1/8$, performing filtering by using i) a filter coefficient set corresponding to a phase shift $3/8$ in the filter coefficient data for up-sampling for the sampling position having the phase shift of $1/3$ when the ratio is 2:3 and ii) a filter coefficient set corresponding to a phase shift $5/8$ in the filter coefficient data for up-sampling for a sampling position having a determined phase shift of $2/3$ when the ratio is 2:3.

* * * * *